(12) United States Patent
Sundararajan et al.

(10) Patent No.: US 11,003,238 B2
(45) Date of Patent: May 11, 2021

(54) CLOCK GATING COUPLED MEMORY RETENTION CIRCUIT

(71) Applicant: NVIDIA Corporation, Santa Clara, CA (US)

(72) Inventors: Anand Shanmugam Sundararajan, Chennai (IN); Ramachandiran V, Bangalore (IN); Abhijeet Chandratre, Bangalore (IN); Lordson Yue, Los Altos, CA (US); Archana Srinivasaiah, Bangalore, IN (US); Sachin Idgunji, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 558 days.

(21) Appl. No.: 15/583,872

(22) Filed: May 1, 2017

(65) Prior Publication Data
US 2018/0284874 A1 Oct. 4, 2018

Related U.S. Application Data

(60) Provisional application No. 62/481,084, filed on Apr. 3, 2017.

(51) Int. Cl.
*G06F 1/3234* (2019.01)

(52) U.S. Cl.
CPC ................ *G06F 1/3275* (2013.01)

(58) Field of Classification Search
CPC .... G06F 1/3206; G06F 1/3234; G06F 1/3275; Y02D 10/00
See application file for complete search history.

(56) References Cited

U.S. PATENT DOCUMENTS

| | | | | |
|---|---|---|---|---|
| 5,615,162 A | * | 3/1997 | Houston ................ | G11C 5/14 365/226 |
| 6,597,620 B1 | * | 7/2003 | McMinn ................ | G11C 7/20 327/544 |
| 6,803,810 B2 | * | 10/2004 | Yamada ................ | H04B 1/40 327/544 |
| 2005/0068799 A1 | * | 3/2005 | Bedwell ............... | G06F 1/3203 365/63 |
| 2010/0174933 A1 | * | 7/2010 | Lu ........................ | G06F 1/3203 713/324 |

(Continued)

*Primary Examiner* — Jaweed A Abbaszadeh
*Assistant Examiner* — Brian J Corcoran
(74) *Attorney, Agent, or Firm* — Artegis Law Group, LLP

(57) ABSTRACT

A hierarchy of interconnected memory retention (MR) circuits detect a clock gating mode being entered at any level of an integrated circuit. In response, the hierarchy automatically transitions memory at the clock gated level and all levels below the clock-gated level from a normal operating state to a memory retention state. When a memory transitions from a normal operating state to a memory retention state, the memory transitions from a higher power state (corresponding to the normal operating state) to a lower power state (corresponding to the memory retention state). Thus, in addition to the dynamic power savings caused by the clock gating mode, the hierarchy of MR circuits automatically transitions the memory modules at the clock gated level and all levels below the clock gated level to a lower power state. As a result, the leakage power consumption of the corresponding memory modules is reduced relative to prior approaches.

20 Claims, 13 Drawing Sheets

(56) References Cited

U.S. PATENT DOCUMENTS

| | | | |
|---|---|---|---|
| 2013/0166939 A1* | 6/2013 | Gendler | G06F 1/10 713/500 |
| 2013/0332763 A1* | 12/2013 | Palaniappan | G11C 5/148 713/324 |
| 2016/0155491 A1* | 6/2016 | Roberts | G11C 11/40607 711/106 |
| 2016/0179176 A1* | 6/2016 | Kohara | G06F 1/3237 713/322 |
| 2016/0217848 A1* | 7/2016 | Ishizu | G11C 14/0054 |
| 2016/0284406 A1* | 9/2016 | Tomishima | G11C 14/009 |
| 2016/0321070 A1* | 11/2016 | Okazaki | G06F 1/3287 |

\* cited by examiner

| Chip | Process | Config GPC,TPC per GPC,FBP | Without MRs | | System Level | | XTAL Level | |
|---|---|---|---|---|---|---|---|---|
| | | | LeakagePower(W) | LeakagePower(W) | LeakagePower(W) | LeakageSavings(%) | LeakagePower(W) | LeakageSavings(%) |
| GP102 | tsmc16fp | 656 | 4.90 | | 2.52 | 48.52% | 2.45 | 50% |
| GP104 | tsmc16fp | 454 | 3.37 | | 1.79 | 47.00% | 1.69 | 50% |
| GP106 | tsmc16fp | 253 | 2.00 | | 1.10 | 45.05% | 1.00 | 50% |
| GP107 | sec14pp | 232 | 0.76 | | 0.62 | 18.40% | 0.61 | 20% |
| GP108 | sec14pp | 131 | 0.42 | | 0.35 | 16.87% | 0.33 | 20% |
| GV202 | tsmc10ff | 666 | 3.74 | | 1.01 | 73.06% | 0.93 | 75% |
| GV204 | tsmc10ff | 464 | 2.56 | | 0.74 | 70.98% | 0.64 | 75% |
| GV206 | tsmc10ff | 263 | 1.50 | | 0.47 | 68.89% | 0.37 | 75% |
| GV207 | tsmc10ff | 242 | 1.11 | | 0.31 | 71.94% | 0.28 | 75% |
| GV208 | tsmc10ff | 141 | 0.61 | | 0.21 | 66.09% | 0.15 | 75% |

Figure 10

CLOCK GATING COUPLED MEMORY RETENTION CIRCUIT

CROSS-REFERENCE TO RELATED APPLICATIONS

This application claims the benefit of United States provisional patent application titled "CLOCK GATING COUPLED RAM RETENTION," filed on Apr. 3, 2017 and having Ser. No. 62/481,084. The subject matter of this related application is hereby incorporated herein by reference.

BACKGROUND OF THE INVENTION

Field of the Invention

Embodiments of the present invention relate generally to integrated circuits and, more specifically, to a clock gating coupled memory retention circuit.

Description of the Related Art

High-performance integrated circuit (IC) chips, such as central processing units (CPUs) and graphics processing units (GPUs), consume relatively high amounts of power. The total power consumed by an IC chip includes dynamic power and leakage power. In general, the amount of dynamic power consumed by an IC chip is a function of the number of devices that are switching between on and off positions during a given period of time (switching rate). Typically, increasing performance of an IC chip involves increasing the clock frequency of the IC chip, thereby increasing the switching rate and dynamic power consumption. In general, the amount of leakage power consumed by an IC chip is a function of the number of devices on an IC chip, the process step associated with those devices, and the operating voltage.

There are many reasons to reduce the power consumption of an IC chip. Reducing power consumption reduces the size and complexity of the power supply and cooling system needed to supply power and sufficient cooling for the IC chip as well as the operating costs. Further, various regulatory bodies, such as the CEC (California Energy Commission) and Energy Star, enforce strict power budgets on high-performance ICs in both thermal design power (TDP) and idle power conditions. TDP is the maximum amount of power/heat generated by an IC chip that the cooling system in a computer is designed to dissipate in typical operation. Idle power is the amount of power/heat generated by a IC chip when powered but not executing an application.

One possible way to reduce power consumption is via clock gating, where the system clock is disabled to various portions of an IC chip that are not currently needed for an executing application. Clock gating can be enabled at various levels of granularities—including system level (disabling the clock for the entire IC chip), engine level (disabling the clock for a particular engine within the IC chip), and sub-engine level (disabling the clock for a portion of an engine). Although clock gating serves to reduce dynamic power consumption, the amount of leakage is typically unaffected by clock gating techniques. Therefore, the total power consumed during the clock gated state remains high, largely due to relatively high levels of leakage current. The issue of high levels of leakage current is particularly problematic for IC chips that have significant amounts of on-chip memory, typically in the form of static random access memory (SRAM). As the amount of SRAM on a typical high-performance IC chip has increased over time, so has the total power consumption. This total power consumption remains relatively high due in large part because SRAM contributes a significant portion of the leakage power in a typical high-performance IC chip.

As the foregoing illustrates, there is a need in the art for a more effective technique for reducing total power consumption of IC chips.

SUMMARY OF THE INVENTION

One embodiment of the present invention sets forth a memory retention circuit that includes a set of circuit components for detecting that a first memory module is entering a clock gating mode, and in response, automatically transitioning the first memory module from a first power state to a second power state.

One advantage of the disclosed techniques is that memory modules that are determined to be clock gated are automatically transitioned to a retention power state, thereby simultaneously reducing the consumption of leakage power (through the retention state) along with dynamic power (through the clock gating) consumed by the memory modules.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 is a table showing exemplary data illustrating leakage power savings achieved by implementing the memory retention (MR) circuits of FIGS. 5-7B according to various embodiments of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
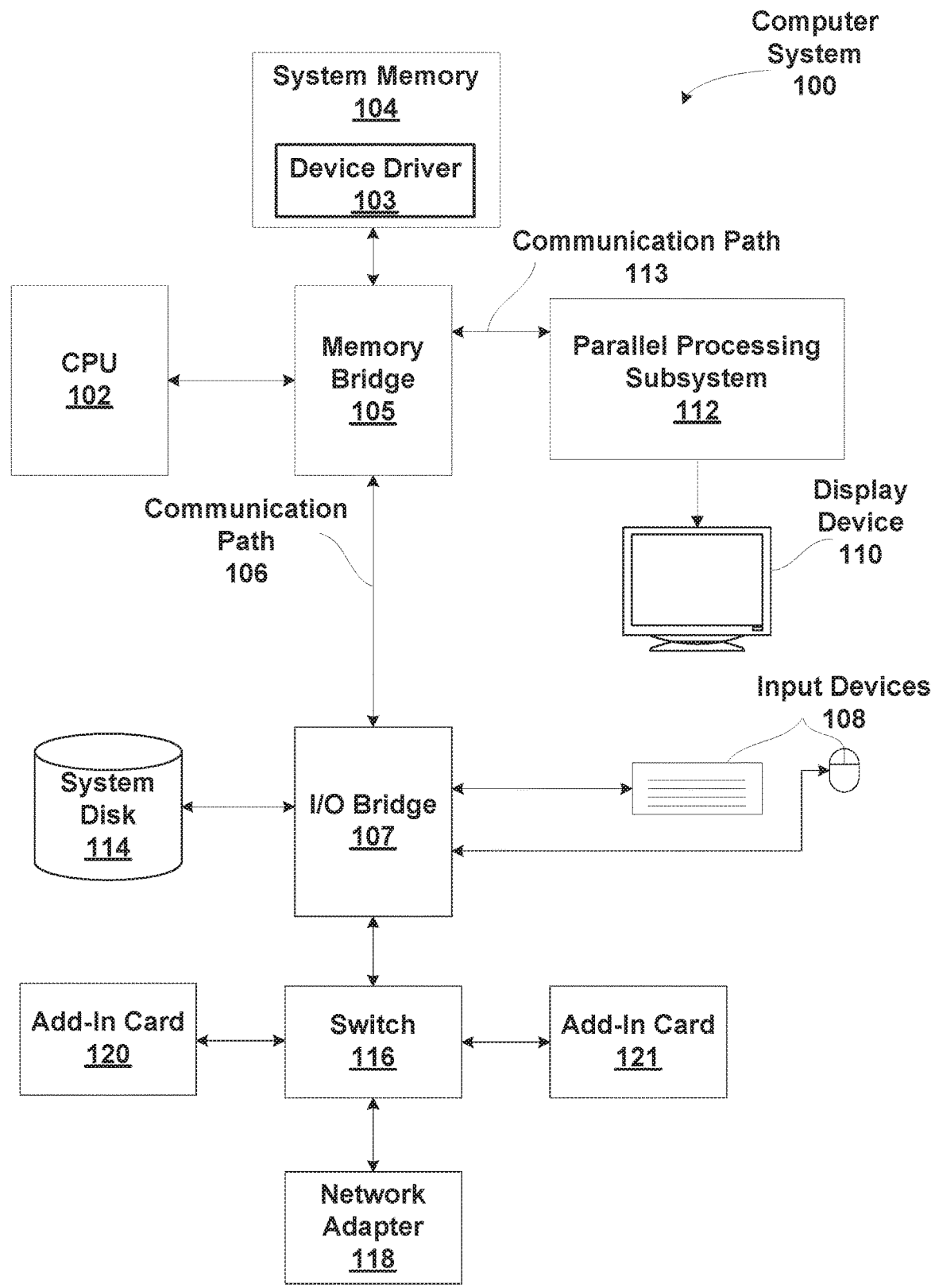
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 is part of a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
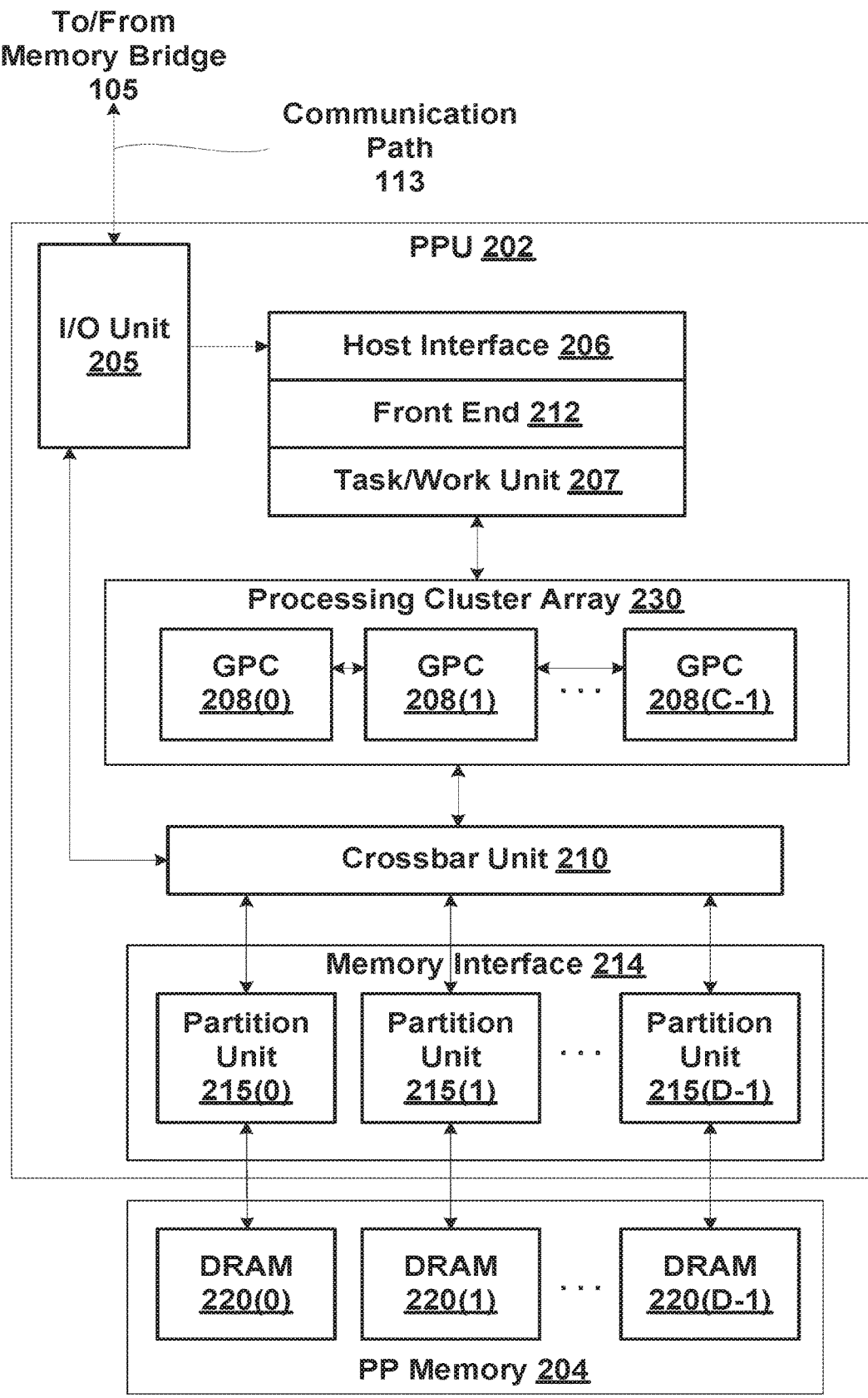
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 includes a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
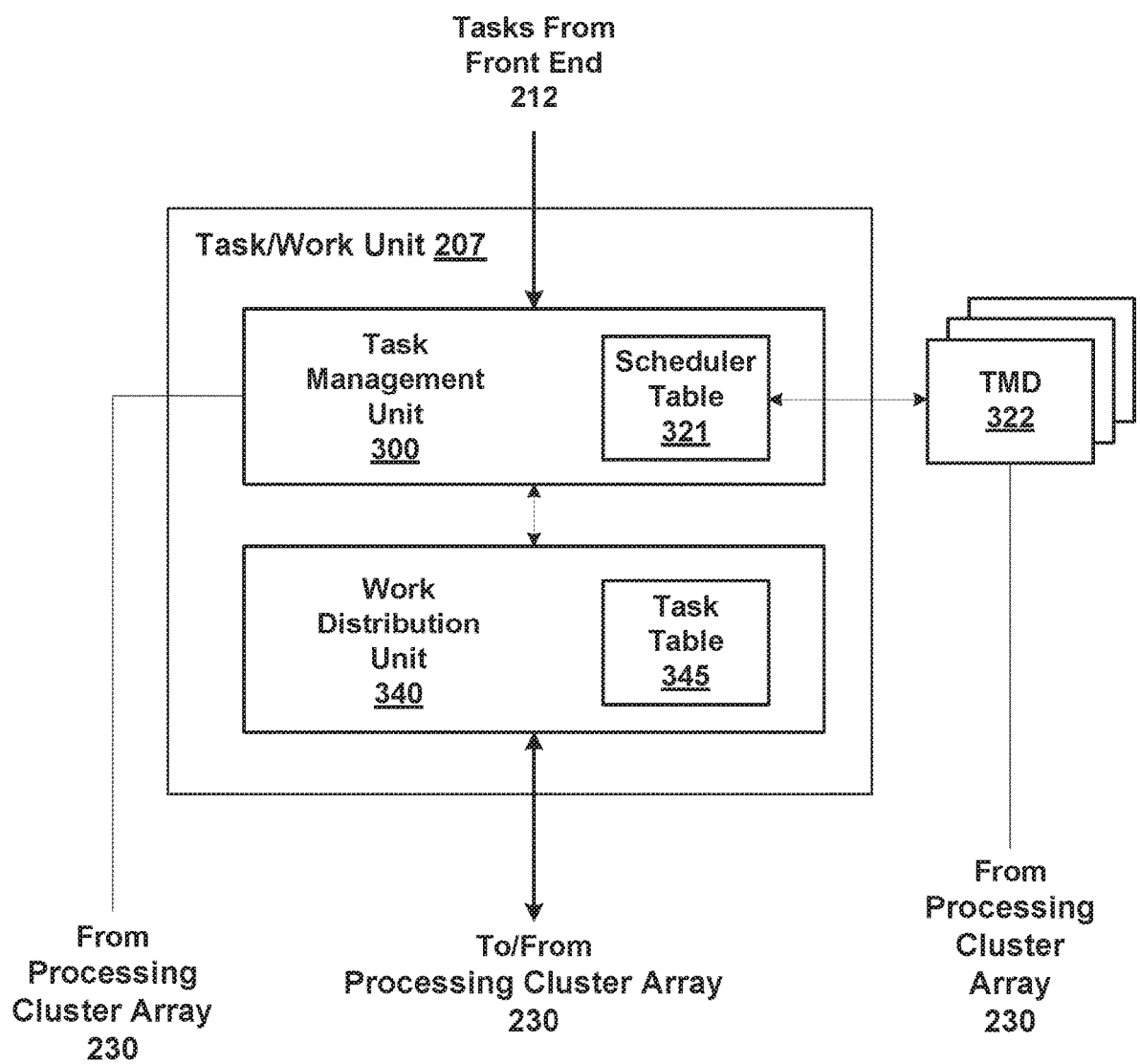
FIG. 3A is a block diagram of the front end of FIG. 2, according to various embodiments of the present invention.

FIG. 3A is a block diagram of the task/work unit 207 of FIG. 2, according to various embodiments of the present invention. The task/work unit 207 includes a task management unit 300 and the work distribution unit 340. The task management unit 300 organizes tasks to be scheduled based on execution priority levels. For each priority level, the task management unit 300 stores a linked list of pointers to the QMDs 322 corresponding to the tasks in the scheduler table 321. The QMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the QMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and, if execution the task is not complete, the task is added to a linked list in the scheduler table 321. When a child processing task is generated, the child task is added to a linked list in the scheduler table 321. A task is removed from a slot when the task is evicted.

Task Processing Overview

Figure 3B:
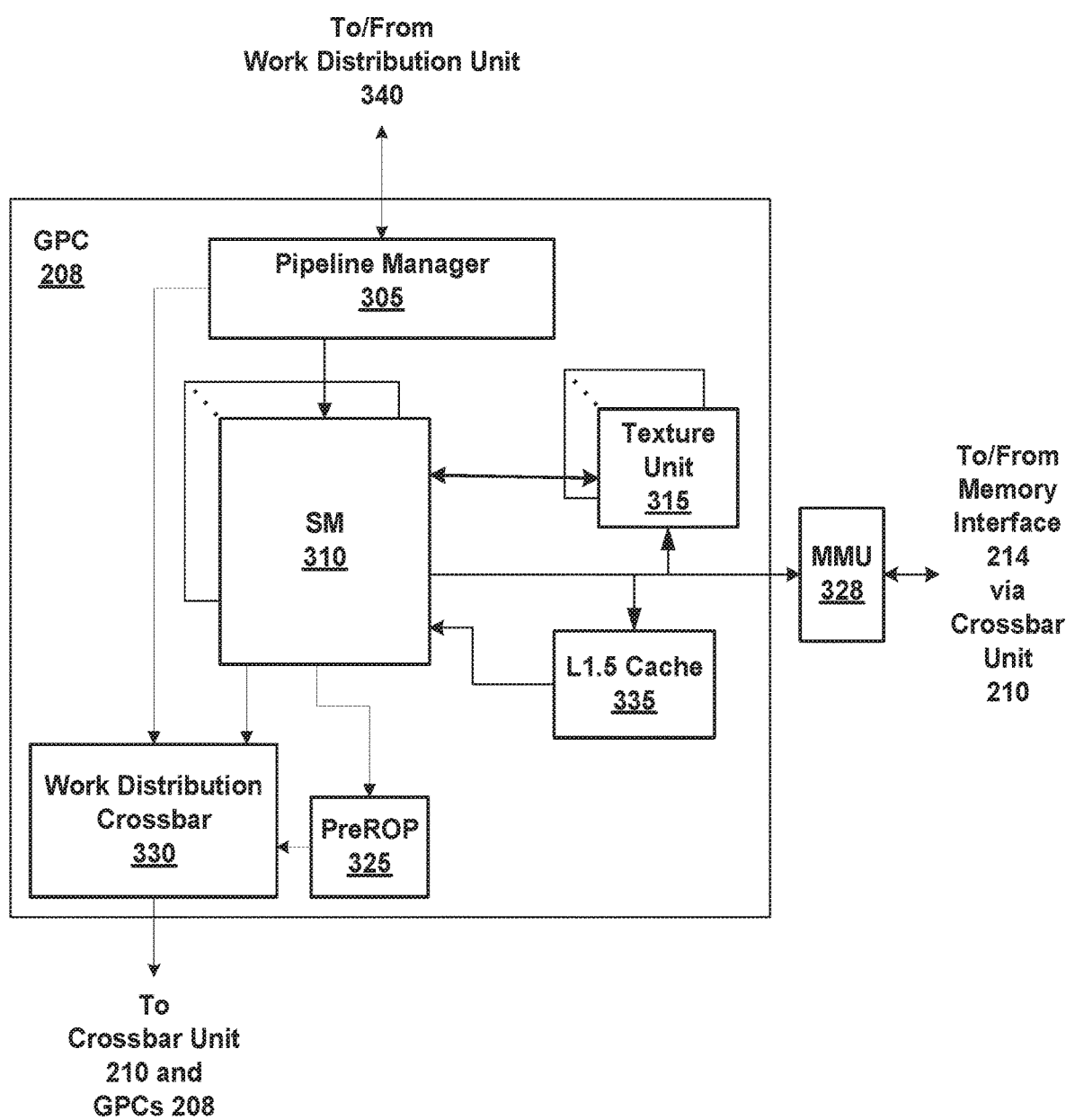
FIG. 3B is a block diagram of a general processing cluster within one of the parallel processing units of FIG. 2, according to various embodiments of the present invention.

FIG. 3B is a block diagram of a GPC 208 within one of the PPUs 202 of FIG. 2, according to various embodiments of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 transmits processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
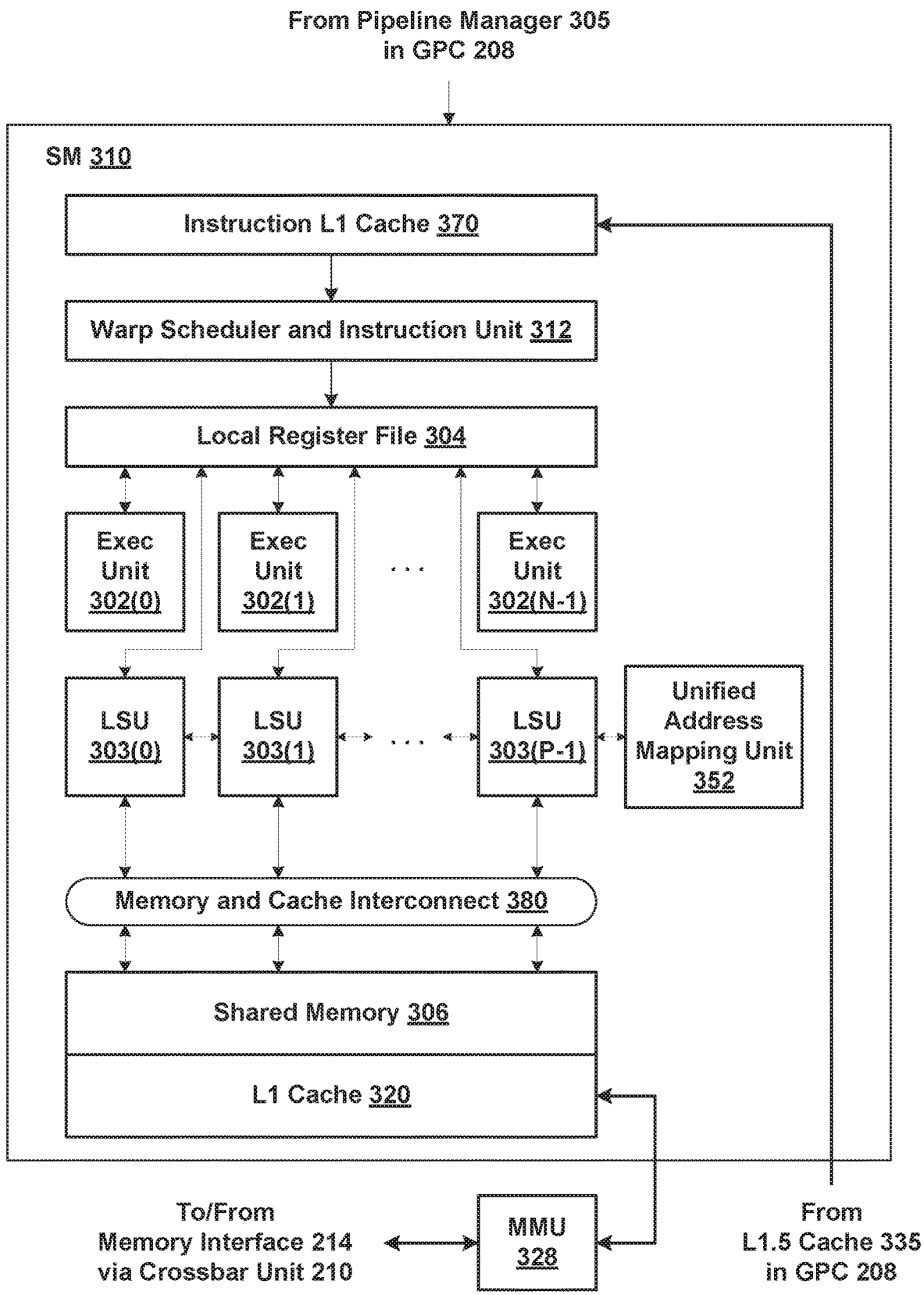
FIG. 3C is a block diagram of a portion of the streaming multiprocessor of FIG. 3B, according to various embodiments of the present invention.

FIG. 3C is a block diagram of the SM 310 of FIG. 3B, according to various embodiments of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads in the same grid or queue (or by all LSUs 303) that store a CTA identifier, the CTA dimensions, the dimensions of a grid to which the CTA belongs (or queue position if a queue), and an identifier of the grid or queue to which the CTA belongs. CTAs that belong to a grid have implicit x,y,z parameters indicating the position of the respective CTA within the grid. Special registers are written during initialization in response to commands received via front end 212 from device driver 103 and do not change during execution of a processing task. The front end 212 schedules each processing task for execution as either a grid or queue. Each CTA is associated with a specific grid or queue for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Among other things, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3C in no way limits the scope of the present invention.

Graphics Pipeline Architecture

Figure 4:
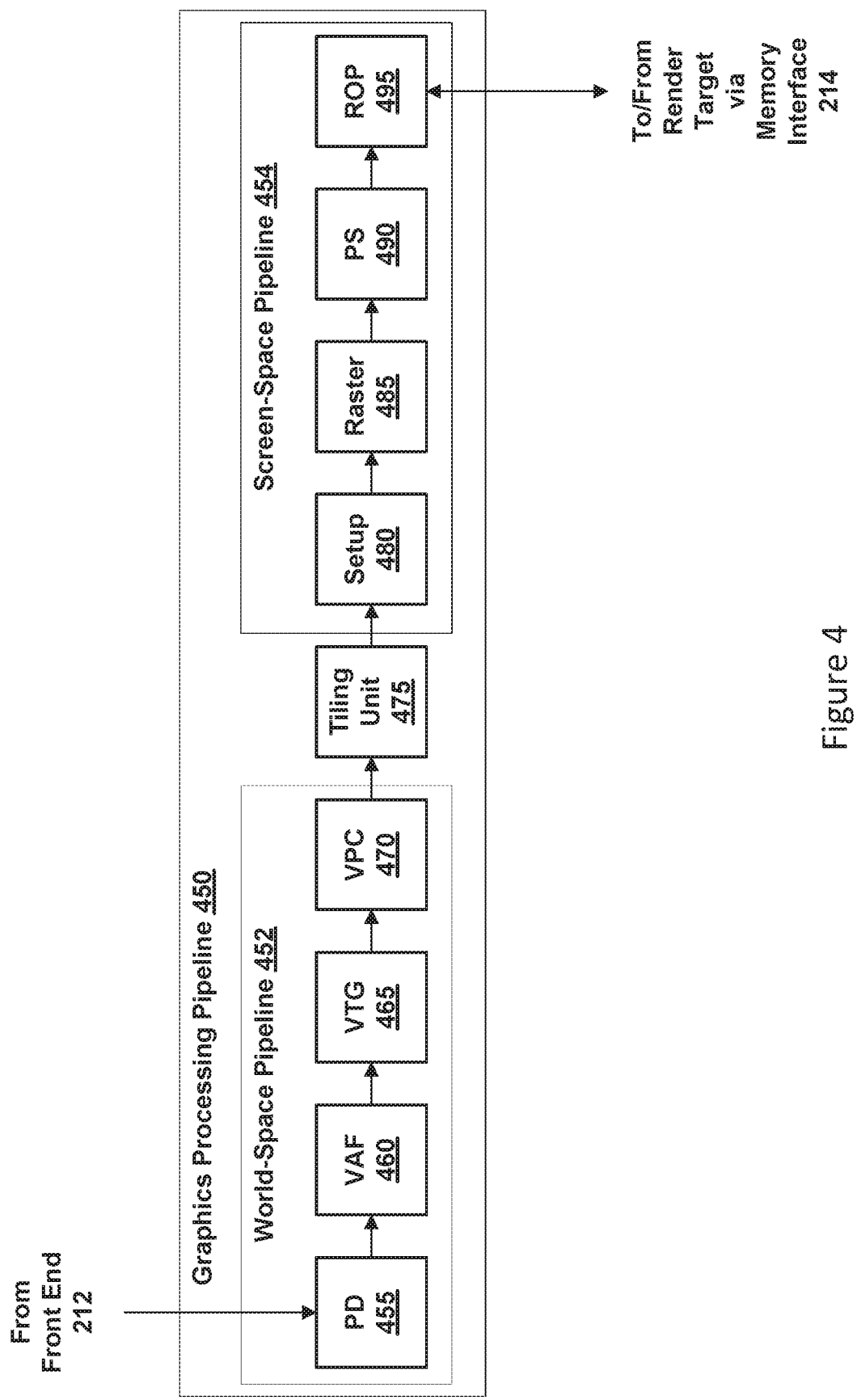
FIG. 4 is a conceptual diagram of a graphics processing pipeline that may be implemented within the parallel processing unit of FIG. 2, according to various embodiments of the present invention.

FIG. 4 is a conceptual diagram of a graphics processing pipeline 450 that may be implemented within PPU 202 of FIG. 2, according to various embodiments of the present invention. As shown, the graphics processing pipeline 450 includes, without limitation, a primitive distributor (PD) 455; a vertex attribute fetch unit (VAF) 460; a vertex, tessellation, geometry processing unit (VTG) 465; a viewport scale, cull, and clip unit (VPC) 470; a tiling unit 475, a setup unit (setup) 480, a rasterizer (raster) 485; a fragment processing unit, also identified as a pixel shading unit (PS) 490, and a raster operations unit (ROP) 495.

The PD 455 collects vertex data associated with high-order surfaces, graphics primitives, and the like, from the front end 212 and transmits the vertex data to the VAF 460. The VAF 460 retrieves vertex attributes associated with each of the incoming vertices from shared memory and stores the vertex data, along with the associated vertex attributes, into shared memory. The VTG 465 is a programmable execution unit that is configured to execute vertex shader programs, tessellation programs, and geometry programs. These programs process the vertex data and vertex attributes received from the VAF 460 and produce graphics primitives, as well as color values, surface normal vectors, and transparency values at each vertex for the graphics primitives for further processing within the graphics processing pipeline 450. Although not explicitly shown, the VTG 465 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world-space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 450.

The task distributor redistributes the tasks produced by the task generation unit. The tasks produced by the various instances of the vertex shader program and the tessellation initialization program may vary significantly between one graphics processing pipeline 450 and another. The task distributor redistributes these tasks such that each graphics processing pipeline 450 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 470. The geometry processing unit may read data that is stored in shared memory for use in processing the geometry data. The VPC 470 performs clipping, culling, perspective correction, and viewport transform to determine which graphics primitives are potentially viewable in the final rendered image and which graphics primitives are not potentially viewable. The VPC 470 then transmits processed graphics primitives to the tiling unit 475.

The tiling unit 475 is a graphics primitive sorting engine that resides between a world-space pipeline 452 and a screen-space pipeline 454, as further described herein. Graphics primitives are processed in the world-space pipeline 452 and then transmitted to the tiling unit 475. The screen-space is divided into cache tiles, where each cache tile is associated with a portion of the screen-space. For each graphics primitive, the tiling unit 475 identifies the set of cache tiles that intersect with the graphics primitive, a process referred to herein as "tiling." After tiling a certain number of graphics primitives, the tiling unit 475 processes the graphics primitives on a cache tile basis, where graphics primitives associated with a particular cache tile are transmitted to the setup unit 480. The tiling unit 475 transmits graphics primitives to the setup unit 480 one cache tile at a time. Graphics primitives that intersect with multiple cache tiles are typically processed once in the world-space pipeline 452, but are then transmitted multiple times to the screen-space pipeline 454.

Such a technique improves cache memory locality during processing in the screen-space pipeline 454, where multiple memory operations associated with a first cache tile access a region of the L2 caches, or any other technically feasible cache memory, that may stay resident during screen-space processing of the first cache tile. Once the graphics primitives associated with the first cache tile are processed by the screen-space pipeline 454, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen-space processing of the second cache tile. Accordingly, the overall memory traffic to the L2 caches and to the render targets may be reduced. In some embodiments, the world-space computation is performed once for a given graphics primitive irrespective of the number of cache tiles in screen-space that intersects with the graphics primitive.

The setup unit 480 receives vertex data from the VPC 470 via the tiling unit 475 and calculates parameters associated with the graphics primitives, including, without limitation, edge equations, partial plane equations, and depth plane equations. The setup unit 480 then transmits processed graphics primitives to rasterizer 485.

The rasterizer 485 scan converts the new graphics primitives and transmits fragments and coverage data to the pixel shading unit 490. Additionally, the rasterizer 485 may be configured to perform z culling and other z-based optimizations.

The pixel shading unit 490 is a programmable execution unit that is configured to execute fragment shader programs, transforming fragments received from the rasterizer 485, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 495. The pixel shading unit 490 may read data that is stored in shared memory.

The ROP 495 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 495 is configured to compress z or color data that is written to memory and decompress z or color data that is read from memory. In various embodiments, the ROP 495 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, the functions one or more of the PD 455, the VTG 465, the VAF 460, the VPC 450, the tiling unit 475, the setup unit 480, the rasterizer 485, the pixel shading unit 490, and the ROP 495 may be performed by processing elements within a particular GPC 208 in conjunction with a corresponding partition unit 215. Alternatively, graphics processing pipeline 450 may be implemented using dedicated fixed-function processing elements for one or more of the functions listed above. In various embodiments, PPU 202 may be configured to implement one or more graphics processing pipelines 450.

In some embodiments, the graphics processing pipeline 450 may be divided into a world-space pipeline 452 and a screen-space pipeline 454. The world-space pipeline 452 processes geometry objects in 3D space, where the position of each geometry object is known relative to other geometry objects and relative to a 3D coordinate system. The screen-space pipeline 454 processes geometry objects that have been projected from the 3D coordinate system onto a 2D planar surface representing the surface of the display device 110. For example, the world-space pipeline 452 could include pipeline stages in the graphics processing pipeline 450 from the PD 455 through the VPC 470. The screen-space pipeline 454 could include pipeline stages in the graphics processing pipeline 450 from the setup unit 480 through the ROP 495. The tiling unit 475 would follow the last stage of the world-space pipeline 452, namely, the VPC 470. The tiling unit 475 would precede the first stage of the screen-space pipeline 454, namely, the setup unit 480.

In some embodiments, the world-space pipeline 452 may be further divided into an alpha phase pipeline and a beta phase pipeline. For example, the alpha phase pipeline could include pipeline stages in the graphics processing pipeline 450 from the PD 455 through the task generation unit. The beta phase pipeline could include pipeline stages in the graphics processing pipeline 450 from the topology generation unit through the VPC 470. The graphics processing pipeline 450 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 450, the vertex data and vertex attributes associated with a set of geometry objects may be divided so that each graphics processing pipeline 450 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 455 and VAF 460. Further, the task generation unit associated with one graphics processing pipeline 450 may produce a significantly greater quantity of vertex data and vertex attributes than the task generation unit associated with another graphics processing pipeline 450, even in cases where the two graphics processing pipelines 450 process the same quantity of attributes at the beginning of the alpha phase pipeline. In such cases, the task distributor redistributes the attributes produced by the alpha phase pipeline such that each graphics processing pipeline 450 has approximately the same workload at the beginning of the beta phase pipeline.

Clock Gating Coupled Memory Retention

According to embodiments described herein, a clock gating coupled memory retention circuit (MR circuit) detects when clock gating is enabled at a particular level of an integrated circuit and reacts to it by automatically transitioning memories at the clock gated level and all memories at lower levels of the integrated circuit into a memory retention state. While clock gating reduces dynamic power consumption, transitioning memory modules to a memory retention state reduces leakage power consumption associated with the corresponding memory modules. The disclosed embodiments include two types of memory retention schemes. In a first type, referred to as shallow memory retention, the periphery logic internal to a memory module is power gated, while the bit cell array of the memory remains at full power. The data content of the memory bit cell array is retained in shallow memory retention. In a second type, referred to as deep memory retention, the periphery logic internal to a memory module is power gated, while the supplied voltage to the bit cell array is reduced to a retention voltage internal to the memory module. The data content of the memory bit cell array is also retained in deep memory retention.

The integrated circuit may be logically represented and defined as a hierarchy of different levels. For example, the integrated circuit may include a GPU (such as parallel processing subsystem 112) or a CPU (such as a CPU 102). In general, the integrated circuit may include any integrated circuit that may be logically defined as a hierarchy of different levels. The domain (boundary) of each level is defined as including particular elements of the integrated circuit. The domain of a particular level includes elements defined at the particular level as well as elements in the domains of all lower levels. Elements that are defined at a particular level includes circuit components and the associated memory modules that the circuit components at the particular level use in normal operation.

As used herein, circuit components may include logic circuits, processing circuits, and other types of circuits that access and use memory in normal operation. As used herein, a memory module associated with a circuit component may include any form of on-chip memory used by the circuit component (e.g., for read/write operations). The associated memory module may be internal to the circuit component (reside on the circuit component itself such as a cache) or include a separate device that is external to the circuit component. Examples of an associated memory module includes, without limitation, static random access memory (SRAM), dynamic random access memory (DRAM), read only memory (ROM), and variants thereof. Thus, each level may have a set of elements that includes circuit components and associated memory modules that are defined at the level.

Figure 5:
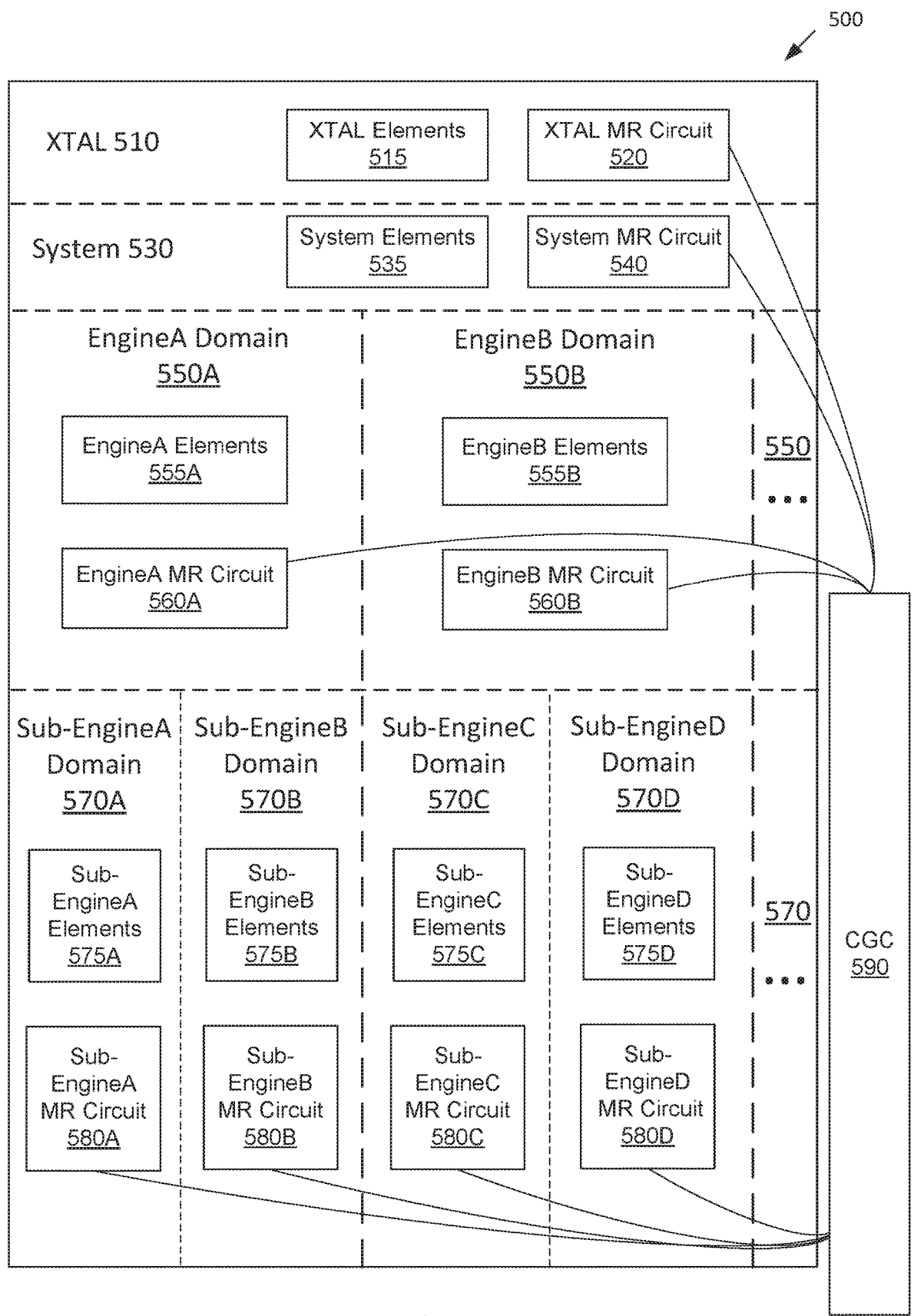
FIG. 5 is a block diagram of a hierarchy of levels representing an integrated circuit, according to various embodiments of the present invention.

FIG. 5 is a block diagram of a hierarchy of levels representing an integrated circuit, according to various embodiments of the present invention. As shown, the hierarchy of levels 500 may be defined to include (from highest to lowest levels) an XTAL level 510, system level 530, engine level 550, and a sub-engine level 570. The engine level 550 may include a plurality of separate domains for each engine, such as engine 550A and 550B. The sub-engine level 550 may include a plurality of separate domains for each sub-engine, such as sub-engine 570A and sub-570B. In the embodiments described below, the hierarchy of levels 500 represents a GPU (such as parallel processing subsystem 112). In other embodiments, the hierarchy of levels 500 may represent any other type of integrated circuit.

The XTAL level 510, also referred to herein as the global clock (GC) level, includes the highest level of the hierarchy 500 and includes all elements of the integrated circuit. "XTAL" refers to the crystal oscillator used to generate the oscillating clock signal for entire the integrated circuit. In general, clock gating at the XTAL level 510 disables the clock for the entire integrated circuit (such as a GPU). In particular, the domain of the XTAL level 510 includes elements defined at the XTAL level (XTAL elements 515) and all elements in the domains of the system level 530, engine level 550, and sub-engine level 570. The XTAL elements 515 include the only elements of the integrated circuit that are not included in the domain of the system level 530. For example, the XTAL elements 515 may include circuit components comprising all host units for interfacing the parallel processing subsystem 112 with the host CPU 102. For example, the host units could include the I/O (input/output) unit 205, host interface 206, front end 212, and task/work unit 207 shown in FIG. 2. The host units may use associated memory modules in normal operation. Thus, the XTAL elements 515 may include circuit components (e.g., host units) and associated memory modules that are defined at the XTAL level 510.

The system level 530, also referred to herein as the master system clock gating (MSCG), includes the next lower level of the hierarchy 500. In general, clock gating at the system level 530 disables the clock for the memory subsystem and all GPU engines of the integrated circuit. In particular, the domain of the system level 530 includes elements defined at the system level 530 (system elements 535) and all elements in the domains of the engine level 550 and sub-engine level 570. Thus, the domain of the system level 530 includes all elements of the integrated circuit except the XTAL elements 515 defined at the XTAL level 510. For example, the system elements 535 defined at the system level could include circuit components comprising the memory subsystem, such as the crossbar unit 210, memory interface 214 and memory elements 204 shown in FIG. 2. These system level circuit components may use associated memory modules in normal operation. Thus, the system elements 535 may include circuit components and associated memory modules that are defined at the master system clock gating level 530.

The engine level 550, also referred to herein as engine level clock gating (ELCG) level, includes the next lower level of the hierarchy 500. In general, clock gating at the engine level 550 disables a particular GPU engine of the integrated circuit. The domain of the engine level 550 includes elements defined at the engine level (engine elements 555A and 555B) and elements in the domain of sub-engine level 570. For example, EngineA domain 550A and EngineB domain 550B of the engine level 550 may correspond to an engine, such as a general processing cluster (GPC) 208 shown in FIG. 2. The engine elements 555A and 555B may include circuit components of the corresponding engine that are not defined in the domain of any sub-engine blocks of the engine. For example, the engine elements 555A and 555B may include the pipeline manager 305 and work distribution crossbar 330 shown in FIG. 3B. These engine level circuit components may use associated memory modules, such as L1.5 cache 335 shown in FIG. 3B and one or more DRAMs 220 shown in FIG. 2. Thus, the engine elements 555A and 555B may include circuit components and associated memory modules that are defined at the engine level 550.

The sub-engine level 570, also referred to herein as sub-engine level clock gating (SLCG) level, includes the lowest level of the hierarchy 500. In general, clock gating at the sub-engine level 570 disables a particular sub-engine block of a particular GPU engine. Since the sub-engine level 570 is the lowest level of the hierarchy 500, the domain of the sub-engine level 570 includes only elements defined at the sub-engine level (sub-engine elements 575A, 575B, 575C, and 575D). A sub-engine 570A, 570B, 570C, and 570D of a corresponding engine 550A and 550B may include a defined sub-portion of the corresponding engine 550A and 550B. The exact domain/boundaries of the sub-engine within the engine may vary depending on implementation. For example, an engine may include a general processing cluster (GPC) 208 and a sub-engine block may include a single streaming multiprocessor (SM) 310 shown in FIG. 3B. Thus, the sub-engine elements 575 may include all or some circuit components of the SM 310 shown in FIG. 3C (such as the Exec units 302 and LSUs 303). These sub-engine level circuit components may use associated memory modules, such as instruction L1 cache 370, shared memory 306, and L1 cache 320 shown in FIG. 3C. Thus, the sub-engine elements 575 may include circuit components and associated memory modules that are defined at the sub-engine level 570.

In some embodiments, the domain of the system level 530 includes several different GPU engines, each GPU engine comprising a plurality of sub-engines. For example, a GPU engine may include general processing clusters (GPCs) 208 and each GPU within the plurality of GPU engines may include a graphics engine, compute engine, display engine, and the like. Further, each GPU engine may be divided into a plurality of sub-engines (such as a plurality of SMs 310). In these embodiments, the engine level 550 may be considered as including a plurality of engine domains, each engine domain corresponding to particular GPU engine. As shown in FIG. 5, the engine level 550 may include an EngineA domain 550A corresponding to GPU EngineA (e.g., graphics engine), an EngineB domain 550B corresponding to GPU EngineB (e.g., compute engine), and so forth. The domain of the system level 530 thus includes all of the engine domains at the engine level 550.

Further, the sub-engine level 570 may be considered as including a plurality of sub-engine domains, each sub-engine domain corresponding to particular sub-engine of a particular GPU engine. As shown in FIG. 5, the sub-engine level 570 may include a first sub-engine domain 570A corresponding to sub-engineA of EngineA and a second sub-engine domain 570B corresponding to sub-engineB of EngineA. The sub-engine level 570 may also include a third sub-engine domain 570C corresponding to sub-engineC of EngineB and a fourth sub-engine domain 570D corresponding to sub-engineD of EngineB, and so forth. Note that an engine domain 530 corresponding to a particular GPU engine includes only the sub-engine domains 570 corresponding to sub-engines included in the particular GPU engine. For example, as shown in FIG. 5, the engine domain 550A corresponding to EngineA only includes sub-engine domains 570A and 570B which correspond to sub-engineA and sub-engineB included in EngineA. Thus, the engine domain 550A corresponding to EngineA does not include the sub-engine domains (e.g., 570C and 570D) of other engine domains, such as engine domain 550B corresponding to EngineB. As a further example, engine domain 550B corresponding to EngineB only includes sub-engine domains 570C and 570D, which correspond to sub-engineC and sub-engineD included in EngineB. Thus, the engine domain 550B does not include the sub-engine domains (e.g., 570A and 570B) of the engine domain 550A.

The hierarchy of levels 500 and corresponding domains described in the embodiments herein are for illustrative purposes only. As will be apparent to those of ordinary skill in the art, the hierarchy of levels 500 of the integrated circuit may be defined in a different manner and may have a different number of levels, different types of levels, and/or different elements defined at each level than described herein without departing from the scope and spirit of the described embodiments. The exact number and types of levels and the domain/boundaries defined for each level within the hierarchy of levels 500 may vary depending on implementation without departing from the scope and spirit of the described embodiments. Further, in the examples used herein, the integrated circuit includes a GPU. In other embodiments, the integrated circuit may include any other type of integrated circuit, such as a CPU.

In some embodiments, the integrated circuit also includes a plurality of MR circuits organized in a hierarchy corresponding to the hierarchy of levels 500 defined for the integrated circuit. At least one MR circuit is implemented at each hierarchy level of the integrated circuit. For example, as shown in FIG. 5, the XTAL level 510 may include an XTAL level MR circuit 520, the system level 530 may include a system level MR circuit 540, the engine level 550 may include one or more engine MR circuits 560A and 560B, and the sub-engine level 570 may include one or more sub-engine MR circuits 580A, 580B, 580C, and 580D. At the engine level 550, each engine domain representing a separate GPU engine may include a separate MR circuit. For example, at the engine level 550, the first engine domain 550A includes a first MR circuit 560A and the second engine domain 550B includes a second MR circuit 560B. At the sub-engine level 570, each sub-engine domain representing a separate sub-engine of a GPU engine may include a separate MR circuit. For example, at the sub-engine level, the first sub-engine domain 570A could include a first MR circuit 580A and the second sub-engine domain 570B could include a second MR circuit 580B.

In the resulting hierarchy of MR circuits, each MR circuit in the hierarchy is individually coupled to a clock gating (CG) circuit 590. Each MR circuit at a particular level of the hierarchy is also coupled to one or more MR circuits residing at the next lower level of the hierarchy (except for the sub-engine MR circuits 580). The CG circuit 590 may include logic that implements clock gating schemes to reduce dynamic power consumption in the integrated circuit. Thus, the CG circuit 590 may determine when and at what level of the integrated circuit to enable clock gating.

Based on the clock gating scheme, the CG circuit transmits an idle signal to each of the MR circuits at the different levels of the integrated circuit. The idle signal may also be referred to here as a clock gating enable signal ("CG_EN"). The idle signal may indicate whether to enable (e.g., idle signal=1) or not enable (e.g., idle signal=0) clock gating at a particular level of the hierarchy. At each level of the hierarchy, the corresponding MR circuit receives the idle signal indicating whether clock gating has been enabled at that level.

An MR circuit at a particular level may receive the idle signal and detect that clock gating has been enabled at that level (referred to herein as the "clock gated level"). In response to detecting that clock gating has been enabled, the MR circuit then transmits a retention enable signal (RET_EN) that indicates a memory retention state is enabled. The MR circuit at the clock gated level transmits the retention enable signal (RET_EN) to each memory module defined at the clock gated level, which automatically causes each memory module to transition from a normal operating state to a memory retention state. When a memory module transitions from a normal operating state to a memory retention state, the memory module transitions from a higher power state (corresponding to the normal operating state) to a lower power state (corresponding to the memory retention state). For example, the retention enable signal may cause the memory module to power gate the periphery logic, and in some cases, also reduce the operating voltage of the bit cell array to a lower memory retention voltage.

The MR circuit at the clock gated level also transmits the retention enable signal (RET_EN) to one or more MR circuits at the next lower level of the hierarchy (except when the clock gated level is the sub-engine level). When each MR circuit at the next lower level receives the retention enable signal (RET_EN), the MR circuit(s) causes each memory module defined at the lower level to transition from a normal operating state to a memory retention state in a similar manner. This process of propagating the retention enable signal (RET_EN) to the MR circuits of each lower level continues until the sub-engine level is reached. In this manner, when clock gating is enabled at a particular level of the integrated circuit, the hierarchy of connected MR circuits operate together to transition each memory module at the clock gated level and corresponding lower levels to the memory retention state.

When clock gating occurs at a particular level, the circuit components of the clock gated level and all levels below the clock-gated level are effectively disabled. Thus, the memory modules associated with the clock gated circuit components do not need to operate normally at full/normal power since the clock gated circuit components are not using the associated memory modules while clock-gated. Therefore, embodiments described herein automatically transition the memory modules associated with clock gated circuit components to a memory retention state. Thus, while clock gating at a level of the integrated circuit reduces dynamic power consumption of all circuit components and memory modules at the clock gated level and lower levels, the hierarchy of MR circuits responsively transitions memory modules at the clock gated level and lower levels to a memory retention state to reduce leakage power consumption associated with the corresponding memory modules.

In some embodiments, the CG circuit 590 is also capable of enabling clock gating for a specific GPU engine and corresponding engine domain (e.g., EngineA domain 550A) within the engine level 550 without clock gating other GPU engines and corresponding engine domains (e.g., EngineB domain 550B) within the engine level 550. Likewise, the CG circuit 590 may also capable of enabling clock gating for a specific sub-engine of a specific GPU engine and corresponding sub-engine domain 570 (e.g., Sub-EngineA domain 570A) within the sub-engine level 570 without clock gating other sub-engines and corresponding sub-engine domains (e.g., Sub-EngineB domain 570B, Sub-EngineC domain 570C, and Sub-EngineD domain 570D) within the sub-engine level 570. In these embodiments, an engine MR circuit 560 within a particular engine domain 550 is coupled to only those memory modules within the particular engine domain 550 and is not coupled to memory modules of other engine domains 550. Further, an engine MR circuit 560 within a particular engine domain is coupled to only those sub-engine MR circuits 580 within sub-engine domains 570 included in particular engine domain. Likewise, a sub-engine MR circuit 580 within a particular sub-engine domain is coupled to only those memory modules within the particular sub-engine domain and is not coupled to memory modules of other sub-engine domains.

For example, in the engine level, the CG circuit 590 may enable clock gating for only EngineA corresponding to EngineA domain 550A. Thus, the engine MR circuit 560A within EngineA domain 550A receives an idle signal from the CG circuit 590 that indicates clock gating has been enabled. In response, engine MR circuit 560A then transmits a retention enable signal (RET_EN) to each memory module within EngineA domain 550A to transition those memory modules to a memory retention state. Here, the memory modules within EngineB domain 550B will not be caused to transition to a memory retention state. Also, the engine MR circuit 560A transmits a retention enable signal (RET_EN) to each of sub-engine MR circuits 580A and 580B that reside within sub-engine domains 570A and 570B, respectively, which are included in EngineA domain 550A.

As another example, in the sub-engine level, the CG circuit 590 may enable clock gating for only Sub-EngineA corresponding to sub-engineA domain 570A. Thus, the sub-engine MR circuit 580A within sub-EngineA domain 570A receives an idle signal from the CG circuit 590 that indicates clock gating has been enabled. In response, sub-engine MR circuit 580A then transmits a retention enable signal (RET_EN) to each memory module within sub-EngineA domain 570A to transition those memory modules to a memory retention state. Here, the memory modules within the other sub-Engine domains 570B, 570C, and 570D are not caused to transition to a memory retention state.

Figure 6:
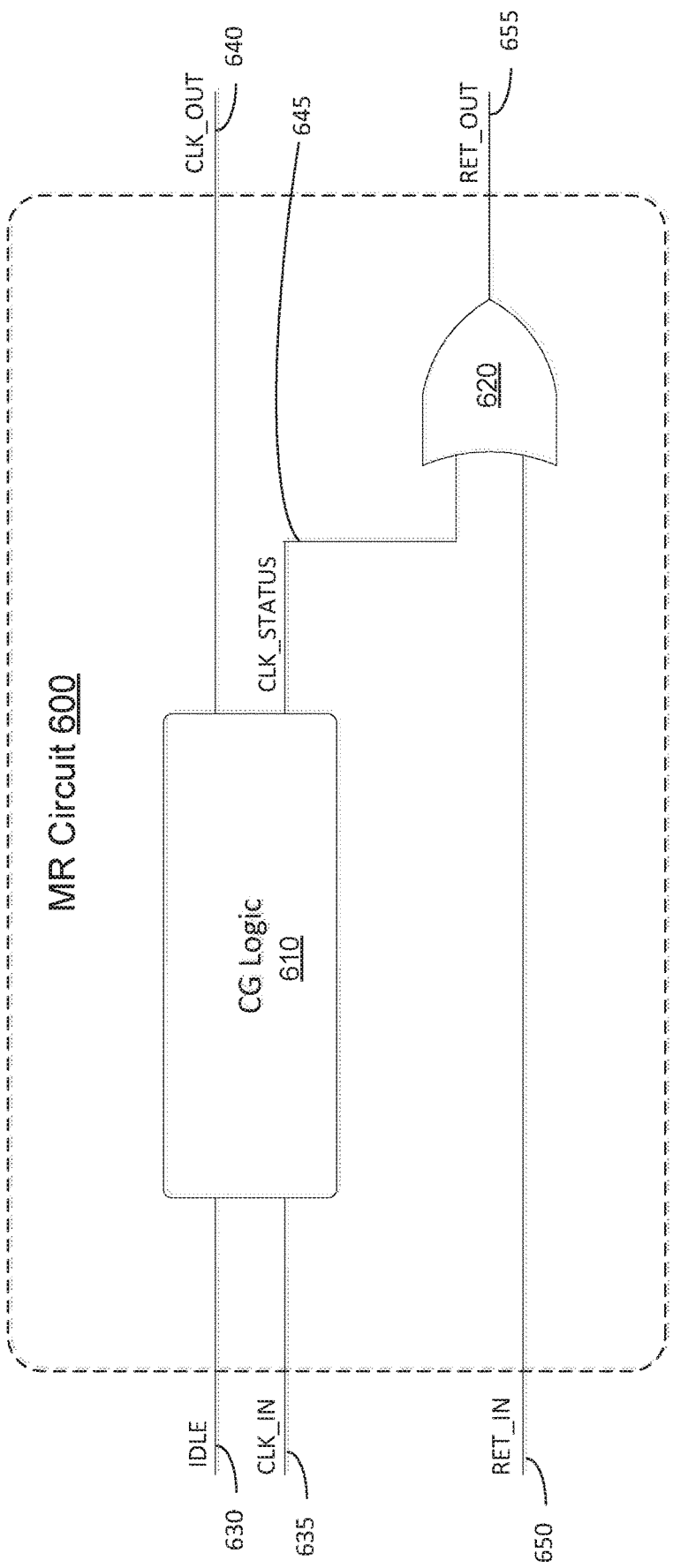
FIG. 6 is a block diagram of one of the memory retention (MR) circuits shown in FIG. 5, according to various embodiments of the present invention.

FIG. 6 is a block diagram of one of the memory retention (MR) circuits shown in FIG. 5, according to various embodiments of the present invention. For example, the MR circuit 600 is exemplary of any of MR circuits shown in the hierarchy of levels 500 shown in FIG. 5, such as XTAL level MR circuit 520, system level MR circuit 540, engine MR circuits 560A and 560B, and sub-engine MR circuits 580A, 580B, 580C, and 580D. The MR circuits 600 at different levels of the hierarchy of levels 500 may be coupled to the clock gating (CG) circuit 590 and to each other to implement the embodiments described herein. As shown in FIG. 6, each MR circuit 600 includes, without limitation, a set of hardware circuit components comprising clock gating logic (CG logic) 610 and an OR gate 620. In some embodiments, the techniques described herein for automatically transitioning memory modules into a memory retention state may be implemented completely in hardware via the hierarchy of interconnected MR circuits 600. In these embodiments, the techniques described herein may not require the use of software (e.g., to monitor and manage the transition of the memory modules to the memory retention state).

The CG logic 610 of the MR circuit 600 may receive an idle signal (IDLE) 630 from a CG circuit 590. Based on a clock gating scheme, the CG circuit 590 transmits an idle signal to each of the MR circuits at the different levels of the integrated circuit. The idle signal may indicate whether to enable (e.g., idle signal=1) or not enable (e.g., idle signal=0) clock gating at a particular level of the hierarchy. At each level of the hierarchy, the CG logic 610 of the corresponding MR circuit 600 receives the idle signal from the CG circuit 590 indicating whether clock gating has been enabled at that level.

The CG logic 610 may also receive a clock signal (CLK_IN) 635. At the highest level, the XTAL level MR circuit 520 receives the clock signal 635 from the CG circuit 590 or the crystal oscillator that generates the clock signal. At all lower levels, the MR circuit 600 receives the clock signal 635 from the MR circuit 600 of the next higher level. For example, the XTAL level MR circuit 520 may send an output clock signal (CLK_OUT) 640 to the system level MR circuit 540, and the system level MR circuit 540 may send an output clock signal (CLK_OUT) 640 to the engine MR circuit 560, and so forth.

Based on the inputs 630 and 635, the CG logic 610 transmits an output clock signal (CLK_OUT) 640 and a clock status signal (CLK_STATUS) 645. In general, if the CG logic 610 detects that either the idle signal (IDLE) 630 indicates clock gating or the clock signal (CLK_IN) 635 is gated, then the CG logic 610 transmits a gated clock signal (GATED_CLK) 640 and a clock status signal (CLK_DISABLE) 645 indicating that the clock is gated/disabled. For example, if the CG logic 610 detects that the idle signal (IDLE) 630 indicates that clock gating is enabled (e.g., idle signal=1), then the CG logic 610 transmits a gated clock signal (GATED_CLK) 640 and a clock status signal (CLK_DISABLE) 645 indicating that the clock is gated/disabled. Or if the CG logic 610 detects that the clock signal (CLK_IN) 635 is gated, then the CG logic 610 also transmits a gated clock signal (GATED_CLK) 640 and a clock status signal (CLK_DISABLE) 645 indicating that the clock is gated/disabled.

However, if the CG logic 610 detects that the idle signal (IDLE) 630 indicates does not clock gating and the clock signal (CLK_IN) 635 is not gated, then the CG logic 610 transmits a non-gated clock signal 640 and a clock status signal 645 indicating the clock is not gated/disabled. For example, if the CG logic 610 detects that the idle signal (IDLE) 630 indicates that clock gating is not enabled (e.g., idle signal=0) and the clock signal (CLK_IN) 635 is not gated, then the CG logic 610 transmits a non-gated clock signal 640 and a clock status signal 645 indicating the clock is not gated/disabled.

The MR circuit 600 at a particular level transmits the clock signal (CLK_OUT) 640, which is then received as an input clock signal 635 at the MR circuit 600 of the next lower level of the hierarchy. Note that the MR circuit 600 at a particular level is coupled to each memory module defined at the particular level. The MR circuit 600 at a particular level also transmits the clock signal (CLK_OUT) 640 to each memory module defined at the particular level, which may clock gate or not clock gate each such memory module depending on the outputted clock signal 640.

The CG logic 610 also transmits the clock status signal 645, which is received as an input by the OR gate 620. The OR gate 620 also receives as input a retention signal (RET_IN) 650 from an MR circuit 600 at the next higher level which indicate whether a memory retention state is enabled at the next higher level. Based on the inputs, the OR gate 620 transmits a retention signal (RET_OUT) 655. In general, if the OR gate 620 detects that either the clock status signal 645 indicates that the clock is gated/disabled (clock status signal=CLK_DISABLE) or that the input retention signal 650 indicates that the memory retention state is enabled at the next higher level (input retention signal 650=RET_EN), then the OR gate 620 transmits a retention signal 655 that indicates the memory retention state is enabled at the current level (output retention signal 655=RET_EN). However, if the OR gate 620 detects that neither the clock status signal 645 indicates that the clock is gated/disabled nor that the input retention signal 650 indicates that the memory retention state is enabled at the next higher level, then the OR gate 620 transmits a retention signal 655 that indicates the memory retention state is not enabled at the current level.

The MR circuit 600 at a particular level transmits the retention signal (RET_OUT) 655, which is then received as an input retention signal (RET_IN) 650 at the MR circuit 600 of the next lower level of the hierarchy. Note that the MR circuit 600 at a particular level is coupled to each memory module defined at the particular level. The MR circuit 600 at a particular level also transmits the retention signal (RET_OUT) 655 to each memory module defined at the particular level. If the output retention signal 655 indicates that the memory retention state is enabled (output retention signal 655=RET_EN), then each memory module defined at the particular level receives the output retention signal 655 which causes the memory module to transition from the normal operating state to the memory retention state. If the output retention signal 655 indicates that the memory retention state is not enabled, then each memory module defined at the particular level remains at the normal operating state.

Figure 7A:
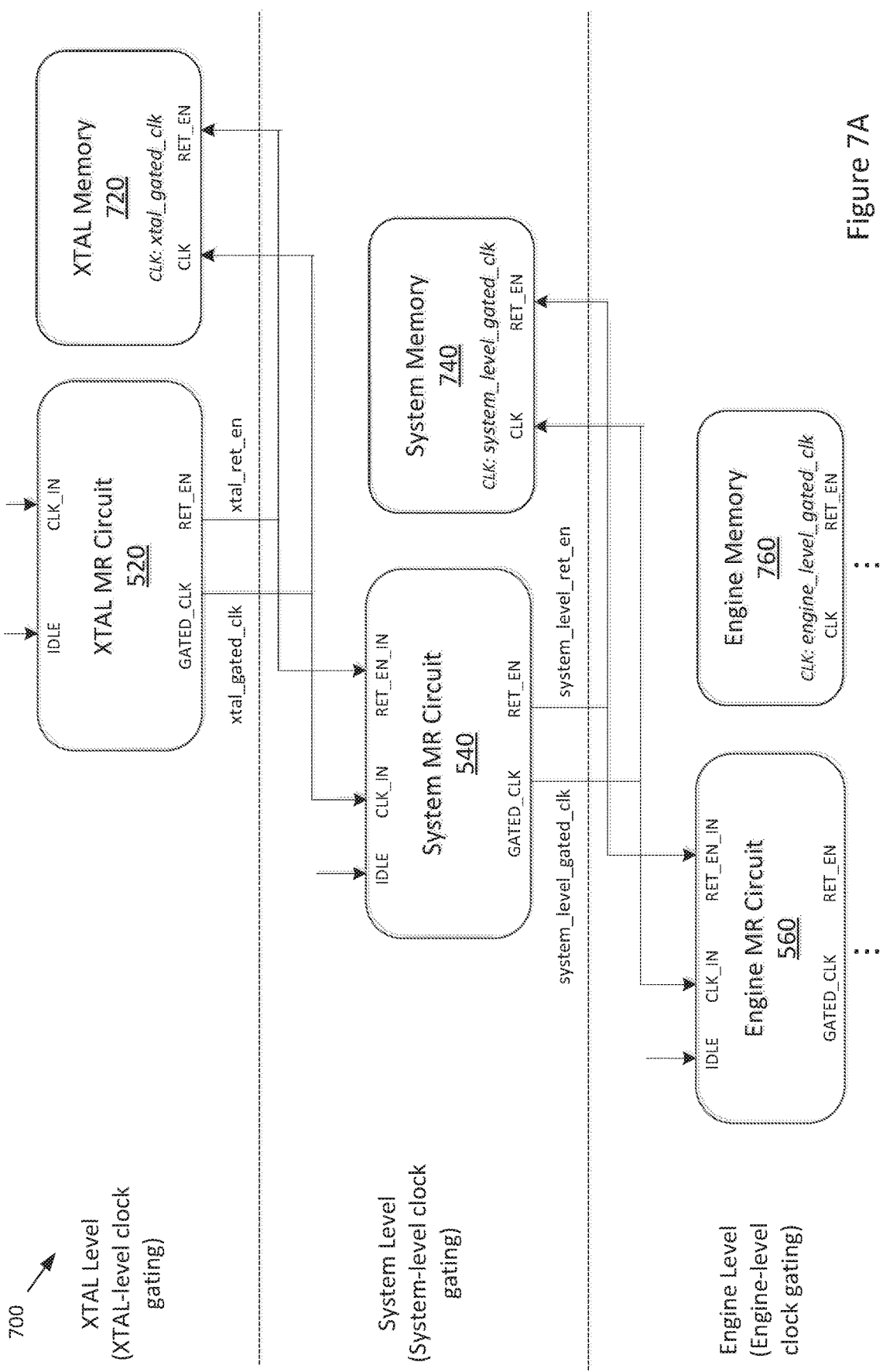
FIGS. 7A-7B illustrate a block diagram of a hierarchy of interconnected memory retention (MR) circuits, according to various embodiments of the present invention.
Figure 7B:
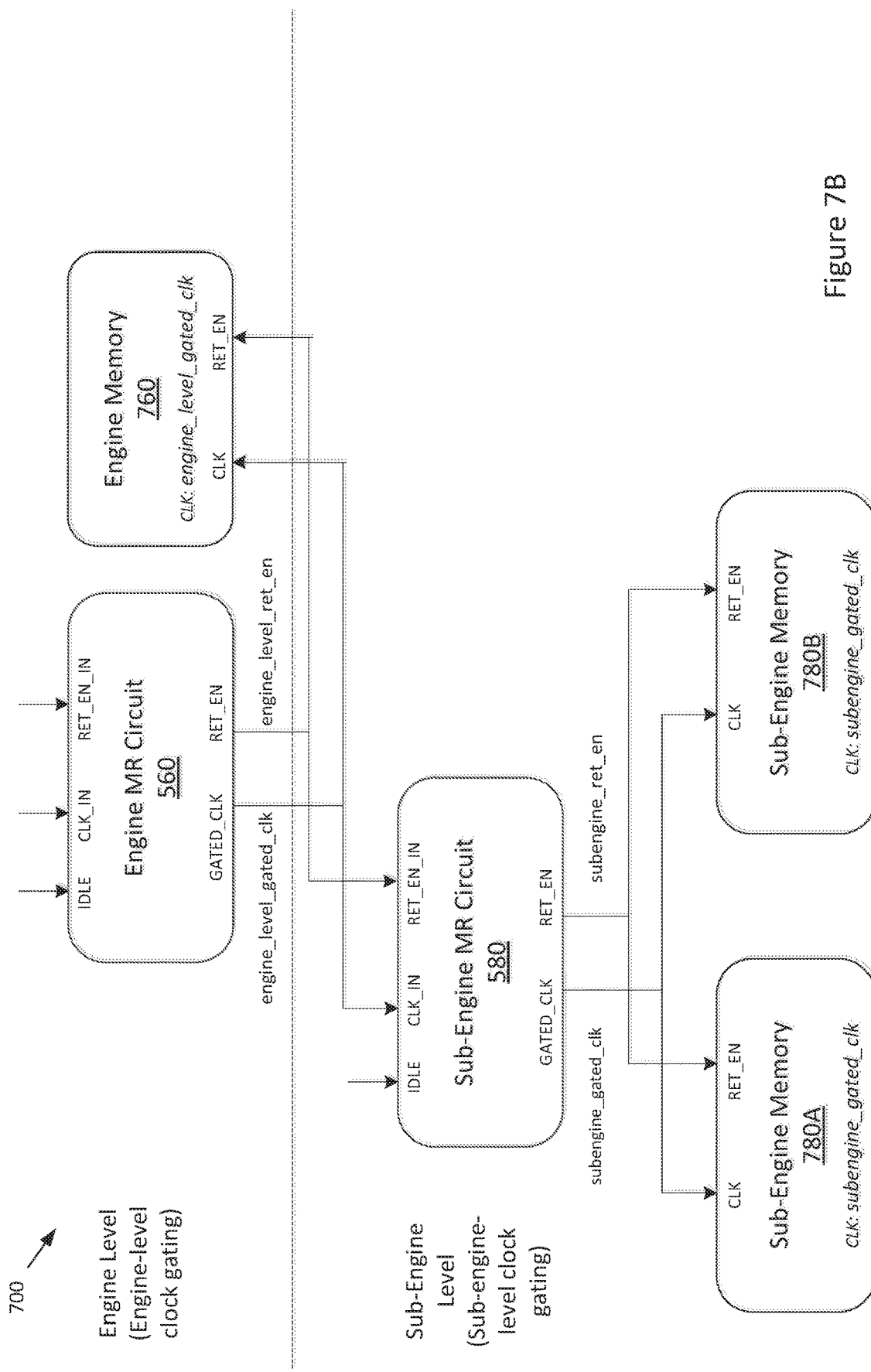

FIGS. 7A-7B illustrate a block diagram of a hierarchy of interconnected memory retention (MR) circuits, according to various embodiments of the present invention. As shown, the hierarchy 700 includes a plurality of MR circuits across a plurality of hierarchy levels, such as XTAL, system, engine, and sub-engine levels. The hierarchy 700 includes at least one MR circuit at each level of the hierarchy 700, such as XTAL level MR circuit 520, system level MR circuit 540, engine MR circuit 560, and sub-engine MR circuit 580. Except for the XTAL level MR circuit 520, each MR circuit is coupled an MR circuit at a next higher level of the hierarchy 700 via a clock signal and a retention signal. Except for the sub-engine MR circuit 580, each MR circuit is also coupled to an MR circuit at a next lower level of the hierarchy 700 via the clock signal and retention signal. Each MR circuit at a particular level is also coupled to at least one memory module defined at the same level via the clock signal and retention signal.

In particular, the XTAL level of the hierarchy 700 includes an XTAL level MR circuit 520 and at least one XTAL level memory 720. The XTAL level MR circuit 520 is coupled to the CG circuit 590 and receives an idle signal and a clock signal from the CG circuit 590. The XTAL level MR circuit 520 is coupled to the system level MR circuit 540 and transmits a clock signal and retention signal to the system level MR circuit 540. The XTAL level MR circuit 520 is also coupled to the at least one XTAL level memory 720 and transmits the clock signal and retention signal to the at least one XTAL level memory 720.

The system level of the hierarchy 700 includes a system level MR circuit 540 and at least one system level memory 740. The system level MR circuit 540 is coupled to the CG circuit 590 and receives an idle signal from the CG circuit 590. The system level MR circuit 540 is also coupled to the XTAL level MR circuit 520 and receives the clock signal and retention signal from the XTAL level MR circuit 520. The system level MR circuit 540 is also coupled to the engine MR circuit 560 and transmits the clock signal and retention signal to the engine MR circuit 560. The system level MR circuit 540 is also coupled to the at least one system level memory 740 and transmits the clock signal and retention signal to the at least one system level memory 740.

The engine level of the hierarchy 700 includes an engine MR circuit 560 and at least one engine level memory 760. The engine MR circuit 560 is coupled to the CG circuit 590 and receives an idle signal from the CG circuit 590. The engine MR circuit 560 is also coupled to the system level MR circuit 540 and receives the clock signal and retention signal from the system level MR circuit 540. The engine MR circuit 560 is also coupled to the sub-engine MR circuit 580 and transmits the clock signal and retention signal to the sub-engine MR circuit 580. The engine MR circuit 560 is also coupled to the at least one engine level memory 760 and transmits the clock signal and retention signal to the at least one engine level memory 760.

The sub-engine level of the hierarchy 700 includes a sub-engine MR circuit 580 and at least one sub-engine level memory 780. The sub-engine MR circuit 580 is coupled to the CG circuit 590 and receives an idle signal from the CG circuit 590. The sub-engine MR circuit 580 is also coupled to the engine MR circuit 560 and receives the clock signal and retention signal from the engine MR circuit 560. The sub-engine MR circuit 580 is also coupled to the at least one sub-engine level memory 780 and transmits the clock signal and retention signal to the at least one sub-engine level memory, such as sub-engine level memories 780A and 780B.

In the example shown in FIGS. 7A-7B, clock gating is enabled at the highest XTAL level by the CG circuit 590 indicating that the entire integrated circuit is clock gated. Thus, the clock signals shown in FIGS. 7A-7B includes a gated clock signal (GATED_CLK) indicating that the circuit components and associated memory modules at the XTAL level and below levels are entering a clock gated mode. Further, the retention signals shown in FIGS. 7A-7B includes a retention enable signal (RET_EN) indicating that a memory retention state is enabled for associated memory modules at the XTAL level and below levels. In particular, the CG circuit 590 transmits an idle signal to the XTAL level MR circuit 520 indicating that clock gating is enabled. From the idle signal, the XTAL level MR circuit 520 detects that clock gating is enabled at the XTAL level of the hierarchy. In response, the XTAL level MR circuit 520 automatically causes the memory modules at the XTAL level and below levels (such as system, engine, and sub-engine levels) to be clock gated and enter a memory retention state. The XTAL level MR circuit 520 may do so by performing the operations described below.

From the idle signal, the XTAL level MR circuit 520 detects that clock gating is enabled at the XTAL level, and in response, automatically transmits a gated clock signal (GATED_CLK) and a retention enable signal (RET_EN) to both the system level MR circuit 540 and to the XTAL level memory 720. The gated clock signal (GATED_CLK) and retention enable signal (RET_EN) received at the XTAL level memory 720 automatically causes the XTAL level memory 720 to be clock gated and to enter a memory retention state.

The gated clock signal (GATED_CLK) and retention enable signal (RET_EN) from the XTAL level MR circuit 520 is also received at the system level MR circuit 540. Based on either the received gated clock signal (GATED_CLK) or the retention enable signal (RET_EN), the system level MR circuit 540 may detect that clock gating is enabled at the system level. In response, the system level MR circuit 540 automatically transmits a gated clock signal (GATED_CLK) and a retention enable signal (RET_EN) to both the engine MR circuit 560 and to the system level memory 740. The gated clock signal (GATED_CLK) and retention enable signal (RET_EN) received at the system level memory 740 automatically causes the system level memory 740 to be clock gated and to enter a memory retention state.

The gated clock signal (GATED_CLK) and retention enable signal (RET_EN) from the system level MR circuit 540 is also received at the engine MR circuit 560. Based on either the received gated clock signal (GATED_CLK) or the retention enable signal (RET_EN), the engine MR circuit 560 may detect that clock gating is enabled at the engine level. In response, the engine MR circuit 560 automatically transmits a gated clock signal (GATED_CLK) and a retention enable signal (RET_EN) to both the sub-engine MR circuit 580 and to the engine level memory 760. The gated clock signal (GATED_CLK) and retention enable signal (RET_EN) received at the engine level memory 760 automatically causes the engine level memory 760 to be clock gated and to enter a memory retention state.

The gated clock signal (GATED_CLK) and retention enable signal (RET_EN) from the engine MR circuit 560 is also received at the sub-engine MR circuit 580. Based on either the received gated clock signal (GATED_CLK) or the retention enable signal (RET_EN), the sub-engine MR circuit 580 may detect that clock gating is enabled at the sub-engine level. In response, the sub-engine MR circuit 580 automatically transmits a gated clock signal (GATED_CLK) and a retention enable signal (RET_EN) to each sub-engine level memory 780A and 780B, which automatically causes each sub-engine level memory 780A and 780B to be clock gated and to enter a memory retention state.

As described above, the hierarchy 700 of interconnected MR circuits operates in conjunction to perform embodiments herein. At least one MR circuit is implemented at each level of the hierarchy 700. An MR circuit 700 at a particular level determines whether clock gating is enabled at the particular level indicating that all circuit components and associated memory modules at the particular level and below levels are entering a clock gating mode. The MR circuit may determine such from an idle signal received from the CG circuit 590 or from a clock signal and/or retention signal received from an MR circuit at the next higher level. If the MR circuit at a particular level detects that clock gating is enabled at the particular level, then, in response, the MR circuit automatically causes the memory modules at the particular level and all lower levels to be clock gated and enter a memory retention state.

Therefore, the hierarchy 700 of interconnected MR circuits operates in conjunction to detect a clock gating mode being entered at any level of the hierarchy 700, and in response, automatically transitions memory modules at the clock gated level and all levels below the clock-gated level from a normal operating state to a memory retention state. When a memory module transitions from a normal operating state to a memory retention state, the memory module transitions from a higher power state (corresponding to the normal operating state) to a lower power state (corresponding to the memory retention state). Thus, in addition to the dynamic power savings caused by the clock gating mode, the hierarchy 700 of interconnected MR circuits automatically transitions the memory modules at the clock gated level and all levels below the clock-gated level to a lower power state, which substantially reduces the leakage power consumption of the corresponding memory modules.

In particular, the clock gating mode and memory retention state of the integrated circuit may be entered when the CG circuit 590 transmits an idle signal to the XTAL level MR circuit 520 indicating that clock gating is enabled. The gated clock signal is then propagated from the XTAL level MR circuit 520 through all the MR circuits at each level until the sub-engine MR circuit 580 is reached. A retention signal indicating that the memory retention state is enabled is also output by the XTAL level MR circuit 520 and propagated through all the MR circuits at each level until the sub-engine MR circuit 580 is reached. The gated clock signal and enabled retention signal that are each propagated through the hierarchy 700 of MR circuits automatically causes each level to enter the clock gating mode and the memory retention state.

Similarly, the clock gating mode and memory retention state of the integrated circuit may be exited when the CG circuit 590 transmits a clock signal and an idle signal to the XTAL level MR circuit 520 indicating that clock gating is not enabled. The normal non-gated clock signal is then propagated from the XTAL level MR circuit 520 through all the MR circuits at each level until the sub-engine MR circuit 580 is reached. A retention signal indicating that the memory retention state is not enabled is also output by the XTAL level MR circuit 520 and propagated through all the MR circuits at each level until the sub-engine MR circuit 580 is reached. The non-gated clock signal and non-enabled retention signal that are each propagated through the hierarchy 700 of MR circuits automatically causes each level to exit the clock gating mode and the memory retention state.

Figure 8:
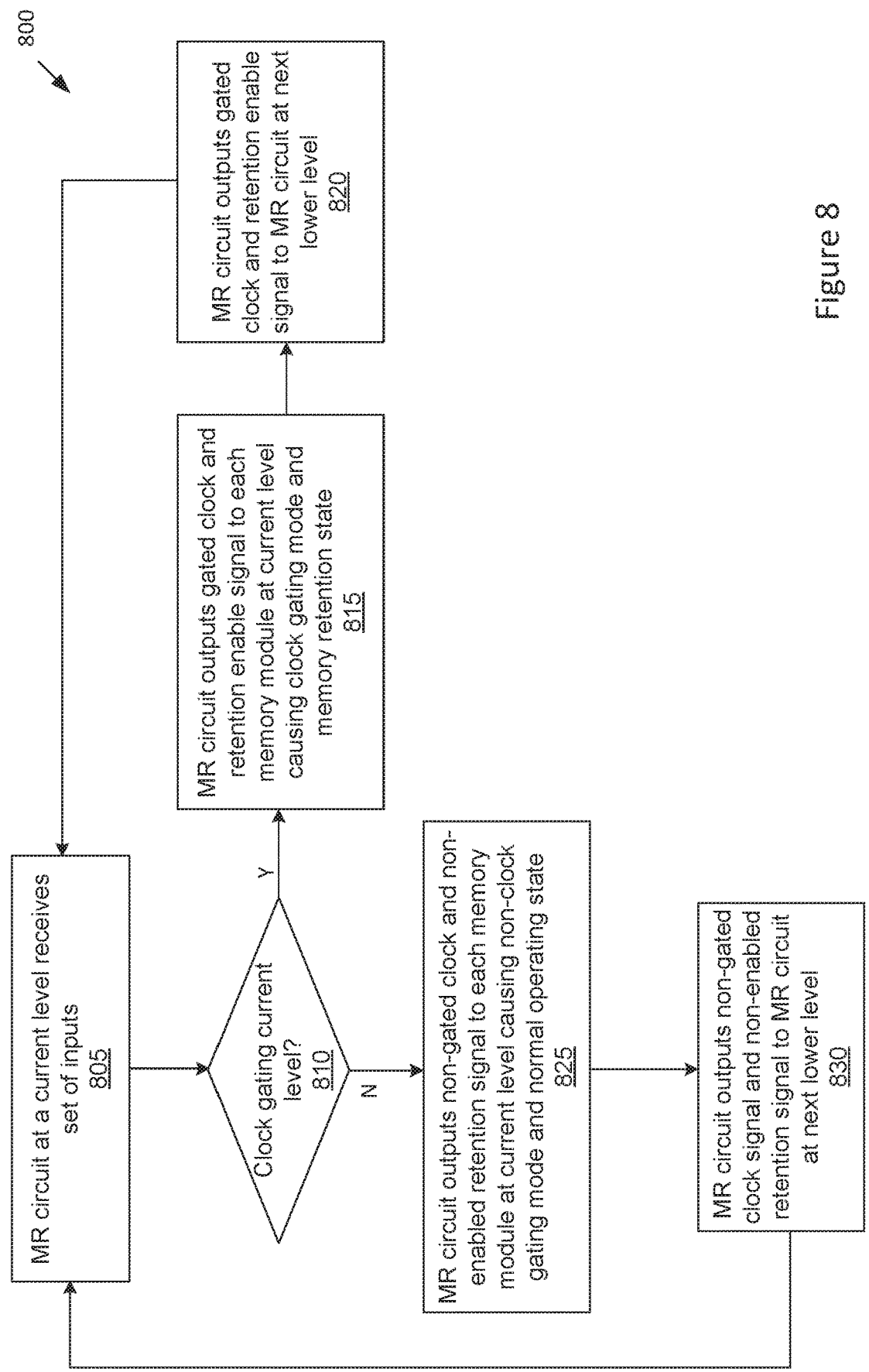
FIG. 8 is a flow diagram of method steps for automatically transitioning memory modules to a memory retention state based on clock gating status, according to various embodiments of the present invention.

FIG. 8 is a flow diagram of method steps for automatically transitioning memory modules to a memory retention state based on clock gating status, according to various embodiments of the present invention. Although the method steps are described in conjunction with the systems of FIGS. 1-7, persons skilled in the art will understand that any system configured to perform the method steps, in any order, is within the scope of the invention. The order and number of steps of the method are for illustrative purposes only and, in other embodiments, a different order and/or number of steps are used. In some embodiments, some or all of the steps of the method are performed or caused to be performed by each MR circuit in a hierarchy 700 of interconnected MR circuits.

As shown, a method 800 begins at step 805, where an MR circuit 600 at a current level in a hierarchy of an integrated circuit receives a set of inputs. If the MR circuit 600 resides at the XTAL level and includes an XTAL level MR circuit 520, then the set of inputs may include an idle signal (IDLE) 630 received from the CG circuit 590 and a clock signal (CLK_IN) 635 received from the CG circuit 590 or the crystal oscillator that generates the clock signal. At lower levels of the hierarchy 700, the set of inputs may include an idle signal (IDLE) 630 received from the CG circuit 590, a clock signal (CLK_IN) 635 received from an MR circuit 600 at the next higher level, and a retention signal (RET_IN) also received from the MR circuit 600 at the next higher level in the hierarchy.

Based on the set of inputs, the MR circuit 600 at the current level then determines (at step 810) whether clock gating is enabled at the current level in the hierarchy. For example, the MR circuit 600 may include logic and gates implemented in hardware that are configured to determine/detect whether clock gating is enabled at the current level and the current level is entering a clock gate mode, as described in relation to FIG. 6.

If the MR circuit 600 determines that clock gating is enabled at the current level (at step 810—Yes), then, in response, the MR circuit 600 automatically performs steps 815 and 820. At step 815, the MR circuit 600 transmits a gated clock signal (GATED_CLK) and a retention enable signal (RET_EN) to each memory module defined at the current level in the hierarchy, which causes each such memory module to automatically transition to or continue to stay in a clock gating mode and memory retention state. At step 820, the MR circuit 600 also transmits the gated clock signal (GATED_CLK) and the retention enable signal (RET_EN) to the MR circuit 600 at the next lower level in the hierarchy, which effectively causes each memory module defined at the next lower level and below levels to also automatically transition to or continue to stay in a clock gating mode and memory retention state. The method 800 then continues at step 805 where the MR circuit 600 receives a next set of inputs.

If the MR circuit 600 determines that clock gating is not enabled at the current level (at step 810—No), then, in response, the MR circuit 600 automatically performs steps 825 and 830. At step 825, the MR circuit 600 transmits a normal non-gated clock signal and a non-enabled retention signal to each memory module defined at the current level in the hierarchy, which causes each such memory module to automatically transition to or continue to stay in a normal non-clock gating mode and normal operating state. At step 830, the MR circuit 600 also transmits the non-gated clock signal and non-enabled retention signal to the MR circuit 600 at the next lower level in the hierarchy, which effectively causes each memory module defined at the next lower level and below levels to automatically transition to or continue to stay in a normal non-clock gating mode and normal operating state. The method 800 then continues at step 805 where the MR circuit 600 receives a next set of inputs.

Figure 9:
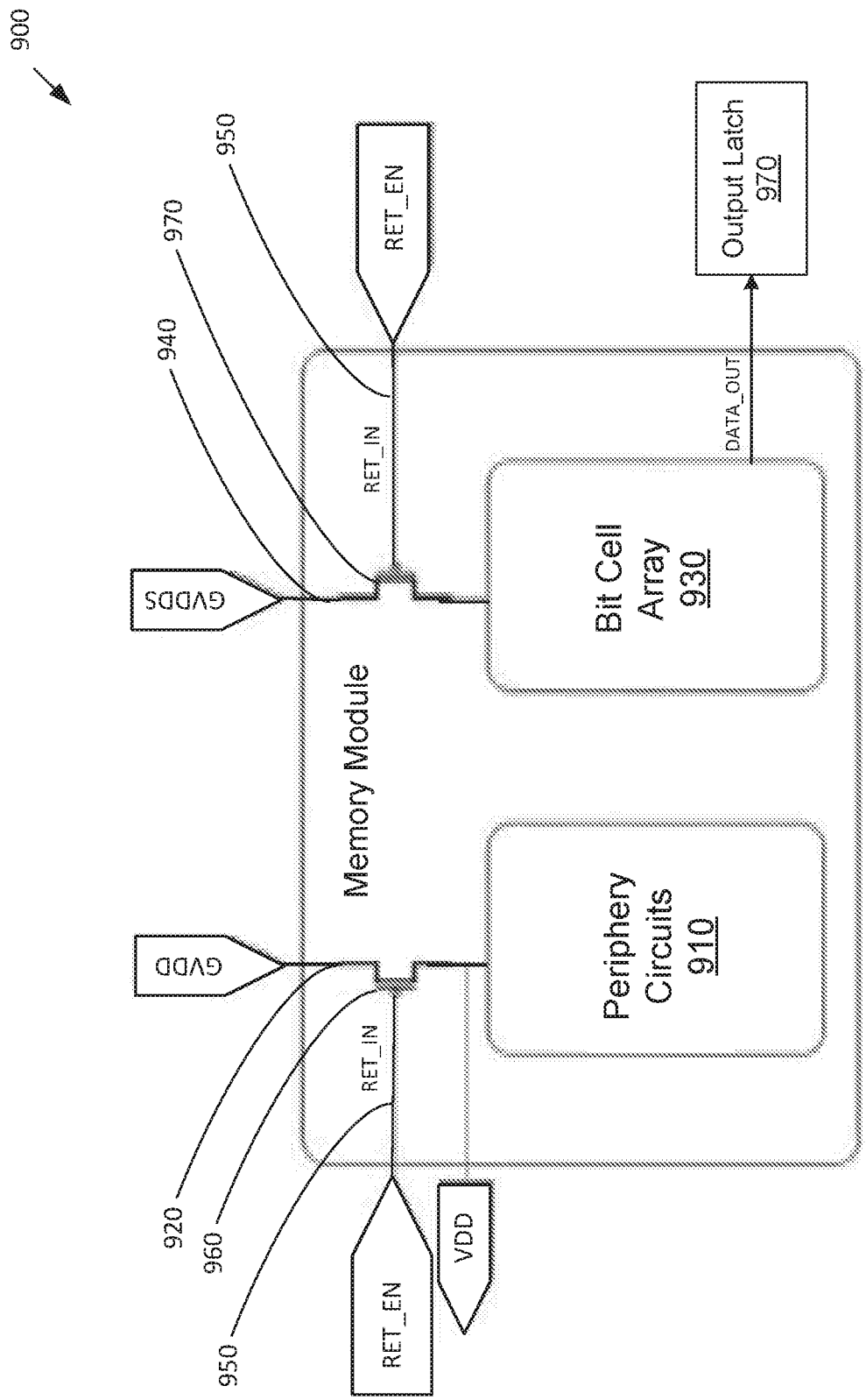
FIG. 9 is a block diagram of the memory module shown in FIGS. 7A-7B, according to various embodiments of the present invention.

FIG. 9 is a block diagram of the memory module shown in FIGS. 7A-7B, according to various embodiments of the present invention. The memory module 900 may represent any memory module that is employed by and associated with any circuit component of any level of the hierarchy of the integrated circuit. For example, the memory module 900 may include XTAL level memory 720, system level memory 740, engine level memory 760, and/or sub-engine level memories 780A and 780B shown in FIGS. 7A-7B.

As shown, the memory module 900 includes periphery circuits 910 and a bit cell array 930. The bit cell array 930 stores the data content of the memory module 900. The periphery circuits 910 may include all logic to operate the memory module in normal operating mode, such as logic to execute read/write operations on data content stored in the bit cell array 930 including decoders to determine memory addresses to read and store data in the bit cell array 930. When the memory module 900 is clock gated, the read/write operations cannot be performed on the memory module 900. Thus, the periphery circuits 910 of the memory module 900 do not require power and can be power gated since the memory module 900 is effectively disabled by the clock gating. Further, depending on the memory retention scheme that is implemented, power to the bit cell array 930 may be kept at full power or reduced to a retention voltage, whereby the data content of the bit cell array 930 is retained. However, in another memory lowpower scheme, power to the bit cell array 930 may also be power gated, whereby the data content of the bit cell array 930 is not retained.

In some embodiments, the different memory retention schemes for the periphery circuits 910 and the bit cell array 930 may be enabled by a split voltage rail design implemented in the memory module 900. As shown, the periphery circuits 910 are coupled to a first voltage rail 920 that supplies power to the periphery circuits 910 and the bit cell array 930 is coupled to a second voltage rail 920 that supplies power to the bit cell array 930. Different amounts of power may be individually applied to each of the first and second voltage rails 920 and 940 to provide different amounts of power to the periphery circuits 910 and the bit cell array 930. In this manner, different amounts of power reductions may be individually applied to each of the first and second voltage rails 920 and 940 depending on the memory retention scheme being implemented. For example, a first power reduction may be applied to the first voltage rail 920 via a diode drop implemented by a first transistor 960 coupled to the first voltage rail 920 and a second power reduction may be applied to the second voltage rail 940 via a diode drop implemented by a second transistor 970 coupled to the second voltage rail 940. In other embodiments, however, the different memory retention schemes may be enabled by a common rail design implemented in the memory module 900, wherein GVDD/GVDDS comprise the same rails.

Each of the first and second voltage rails 920 and 940 are coupled to the retention signal (RET_IN) 950 received from an MR circuit 600 that resides at the same level in the hierarchy as the memory module 900. When the received retention signal (RET_EN) indicates that a memory retention state is enabled, the power to the first and second voltage rails 920 and 940 may be individually reduced or kept the same depending on the memory retention scheme being implemented. Note that when power to the periphery circuits 910 and/or the bit cell array 930 is reduced, the power is reduced via the first and second voltage rails 920 and 940 that are internal to the memory module 900. Thus, any power reductions applied to the periphery circuits 910 and/or the bit cell array 930 does not affect other neighboring memory modules 900.

There are several memory retention schemes that may be implemented. In all the memory retention schemes, however, when the memory module 900 transitions from a normal operating state to a memory retention state, the memory module transitions from a higher power state (corresponding to the normal operating state) to a lower power state (corresponding to the memory retention state). Also, in each such memory retention scheme, the periphery circuits 910 are power gated (i.e., power to the periphery circuits 910 is reduced to 0). In a first memory retention scheme, referred to as shallow memory retention, the bit cell array 930 remains at full power and the data content of the bit cell array 930 is retained. In a second memory retention scheme, referred to as deep memory retention, the power to the bit cell array is reduced to a retention voltage that still allows the data content of the memory bit cell array 930 to be retained. In the second memory retention scheme, the power to the bit cell array 930 is reduced from a full power state (corresponding to the normal operation state) to a lower power state (corresponding to the memory retention state). Thus, in the second memory retention scheme, the power to the bit cell array 930 is reduced to an intermediate power level that is between full power and power gating (power reduced to 0). The intermediate power level may include any power value that is lower than full power but is enough power to retain data content of bit cell array 930.

In some embodiments, the bit cell array 930 is power gated and the power to the bit cell array is reduced to 0, whereby the data content of the memory bit cell array 930 is not retained. This alternative embodiment may be used on memory modules that do not need preservation of data contents. Under certain circumstances, the data contents of some memory modules do not need to be retained. For example, if the memory module enters a clock gating state after a context switch event in a GPU engine, then many of the memory modules in the context switched region can be fully shutdown without the need of retaining the memory contents. In this manner, some of the memory modules having data contents comprising "don't care" data during the clock gated state may be power gated, while other memory modules (whose data contents need to be preserved) are in one of the memory retention modes. Leakage power consumption of memory modules in the alternative embodiment may be reduced by around 98%, as compared to shallow memory retention which may reduce memory leakage power consumption by up to 80% and deep memory retention may reduce memory leakage power consumption by up to 88%.

In some embodiments, a staggering scheme may be employed to spread out the transition of memory modules into the memory retention state, thereby avoiding large sudden current changes on the memory power rail. The staggering scheme may be used to avoid large current changes per unit time (di/dt) on the memory power rail. This staggering latency may be in the order of 10 uS which is negligible compared to overall system level clock gating latency of 400 uS (for XTAL level clock gating) or 300 uS (for system level clock gating). This staggering latency be changed as needed to maintain di/dt to an acceptable level for a given process step and the integrated circuit design. This staggering scheme can be extended to all levels of clock gating and may be applicable for any or all use cases.

In some embodiments, an output latch 970 may be coupled to a data output of the memory module 900. Note that when the periphery circuits 910 are power gated, read operations on the bit cell array 930 cannot be performed to read the data contents of the bit cell array 930. The output latch 970 may store a limited amount of data from the bit cell array 930, such as the most recent data read from the bit cell array 930 before the periphery circuits 910 are power gated. The output latch 970 may continue to retain the state of the stored data even when the periphery circuits 910 are power gated and/or the bit cell array transitions from to a memory retention or power gated state. Thus, the most recent data read from the bit cell array 930 may still be accessed by reading the data captured in the output latch 970. In this manner, some of the data from the memory module 900 may still be available via the output latch 970. As a result, more memory modules may be transitioned to the memory retention state, thereby further decreasing the overall leakage power consumption. For example, the output latch 970 may allow up to 30% more memory modules to be placed in the memory retention state, thereby further reducing the overall leakage power consumption.

As described above, the hierarchy 700 of MR circuits may be used to detect a clock gating mode at a level of the hierarchy and automatically transition memory modules at the clock gated level and all levels below the clock-gated level to a memory retention state. Thus, while clock gating at a level of the integrated circuit reduces dynamic power consumption of circuit components and memory modules at the clock gated level and lower levels, the hierarchy 700 of MR circuits transitions memory modules at the clock gated level and lower levels to a memory retention state to automatically reduce leakage power consumption associated with the corresponding memory modules. The leakage power savings in the memory retention state may come from power gating the periphery circuits of the memory modules and, in some cases, by reducing the voltage to the bit cell array to a retention voltage. For example, shallow memory retention may reduce memory leakage power consumption by up to 80%, and deep memory retention may reduce memory leakage power consumption by up to 88%.

FIG. 10 is a table showing exemplary data illustrating leakage power savings achieved by implementing the memory retention (MR) circuits of FIGS. 5-7B according to various embodiments of the present invention. As shown, the table 1000 shows testing data for different integrated circuit designs (e.g., GP102, GP104, GP106, etc.), processes (e.g., tsmc16ffp, sec14lpp, etc.), and configurations, such as general processing cluster (GPC), texture processing cluster (TPC) and frame buffer partition (FBP). A first section 1010 of the table 1000 shows leakage power amounts of the integrated circuit when the hierarchy of MR circuits is not implemented to automatically transition memory modules to a retention state. A second section 1020 of the table 1000 shows leakage power amounts and leakage power savings (%) of the integrated circuit when the hierarchy of MR circuits is implemented and the clock gating mode is enabled at the system level (MSCG). A third section 1030 of the table 1000 shows leakage power amounts and leakage power savings (%) of the integrated circuit when the hierarchy of MR circuits is implemented and the clock gating mode is enabled at the XTAL level (GC). As shown, implementing the MR circuits in the integrated circuit as described herein may achieve a significant reduction of leakage power within the integrated circuit.

In sum, a clock gating coupled memory retention circuit (MR circuit) detects when clock gating is enabled at a particular level of an integrated circuit. In response to detecting the clock gating, the MR circuit automatically transitions memory at the clock gated level and all memory at lower levels of the integrated circuit into a memory retention state. While clock gating reduces dynamic power consumption, transitioning memory modules to a memory retention state reduces leakage power consumption associated with the corresponding memory modules.

The integrated circuit may be logically defined as a hierarchy of different levels. The domain (boundary) of each level is defined as including particular elements of the integrated circuit, the elements including circuit components and memory modules. The domain of a particular level includes elements defined at the particular level as well as elements in the domains of all lower levels. For example, the hierarchy of levels may be defined to include (from highest to lowest levels) an XTAL level, system level, engine level, and a sub-engine level. The integrated circuit may also include a plurality of MR circuits organized in a hierarchy corresponding to the hierarchy of levels defined for the integrated circuit. At least one MR circuit is implemented at each hierarchy level of the integrated circuit. In the hierarchy of MR circuits, each MR circuit is coupled to a clock gating circuit (CG circuit) and also coupled to each MR circuit at the lower level of the hierarchy (except for the sub-engine MR circuit). Based on a clock gating scheme, the CG circuit may output an idle signal to each of the MR circuits at the different levels of the integrated circuit. The idle signal may indicate whether to enable or not enable clock gating at a particular level of the hierarchy. If an MR circuit at a particular level detects that clock gating is enabled for the level (called the "clock gated level"), then in response to the detection, the MR circuit automatically transmits the retention enable signal (RET_EN) to each memory module defined at the clock gated level, which automatically causes each memory module to transition from a normal operating state to a memory retention state.

The MR circuit at the clock gated level also transmits the retention enable signal (RET_EN) to each MR circuit at the lower level of the hierarchy (except when the clock gated level is the sub-engine level). When each lower MR circuit at the lower level receives the retention enable signal (RET_EN), the lower MR circuit(s) automatically causes each memory module defined at the lower level to transition from a normal operating state to a memory retention state in a similar manner. In this manner, when clock gating is enabled at a particular level of the integrated circuit, the hierarchy of connected MR circuits operate together to transition each memory module at the clock gated level and below to the memory retention state. Thus, while clock gating at a level of the integrated circuit reduces dynamic power consumption, the hierarchy of MR circuits automatically transitions memory modules at the clock gated level and below to a memory retention state to automatically reduce leakage power consumption associated with the corresponding memory modules.

A staggering mechanism can also be employed to spread out the transition of memory modules into memory retention mode, thereby avoiding large sudden current changes on the memory power rail. Further, under certain circumstances, the contents of some memory modules do not need to be retained. For example, if the clock gating state is entered after a context switch event in the integrated circuit, then many of the memory modules in the context switched region can be fully shutdown without the need of retaining the memory contents. In this manner, some of the memory (the contents are "don't care" during the clock gated state) are in full shutdown mode, while other memory (whose contents need to be preserved) are in one of the retention modes. Power consumption of memory modules in full shutdown is reduced by around 98%. Finally, the memory module design can be changed to add an output latch. This output latch continues to retain state even when the periphery logic is power gated. In this manner, the data from the memory module is available for use through this latch. As a result, more memory can be transitioned to the retention state, thereby further decreasing the overall leakage power consumption. Thus feature thereby increases the footprint/number of memory that can engage the MR circuit features.

One advantage of the disclosed techniques is that memory modules that are determined to be clock gated are automatically transitioned to a retention power state, thereby simultaneously reducing the consumption of dynamic power (through the clock gating) and leakage power (through the memory retention state) by the memory modules. Another advantage of the disclosed techniques is that the hierarchy of MR circuits automatically transitions memory modules at a particular clock gated level, and all clock levels below the clock gated level, to a memory retention state in order to automatically reduce leakage power consumption associated with the corresponding memory modules. These features help meet the stringent power budget requirements enforced by different regulatory bodies such as the CEC (California Energy Commission), Energy Star, etc. for different use cases such as winidle (Windows idle,), short idle (viewing static images, photos in windows etc.), and light workload use cases (like web browsing, casual games like angry birds, candy crush etc.).

Please note, as used herein, references to shared memory may include any one or more technically feasible memories, including, without limitation, a local memory shared by one or more GPCs 208, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the present invention have been described above with reference to specific embodiments and numerous specific details are set forth to provide a more thorough understanding of the invention. Persons skilled in the art, however, will understand that various modifications and changes may be made thereto without departing from the broader spirit and scope of the invention. For example, the techniques described herein may be implemented in any architecture configured for parallel processing, whether that architecture be CPU-based, graphics processing unit-based, PPU-based, or distributed using one or more processing units of the same or different type. The foregoing description and drawings are, accordingly, to be regarded in an illustrative rather than a restrictive sense.

Therefore, the scope of the present invention is determined by the claims that follow.

The invention claimed is:

1. An integrated circuit, comprising:
   a first memory module; and
   a memory retention circuit configured to:
      receive a first signal indicating whether the first memory module is entering a clock gating mode,
      receive a first clock signal,
      receive a retention signal,
      generate a clock status signal when either the first signal indicates that the first memory module is entering the clock gating mode or the first dock signal is gated, and
      in response to at least one of the clock status signal or the retention signal, cause a periphery circuit associated with the first memory module to transition from a first power state to a second power state.

2. An integrated circuit, comprising:
   a first memory module comprising a first periphery circuit and a first cell array;
   a second memory module comprising a second periphery circuit and a second cell array; and
   a memory retention circuit configured to:
      receive a first signal indicating whether the first memory module and the second memory module are entering a clock gating mode,
      receive a first clock signal,
      receive a retention signal,
      generate a clock status signal when either the first signal indicates that the first memory module is entering the dock gating mode or the first clock signal is gated, and
      in response to at least one of the clock status signal or the retention signal:
         latch an output state of the first cell array,
         cause the first periphery circuit and the first cell array to transition from a first power state to a second power state at a first point in time,
         determine that contents of the second memory module are no longer needed, and
         cause the second periphery circuit and the second cell array to transition to a full shutdown power state at a second point in time.

3. The integrated circuit of claim 1, wherein the first power state comprises a full power state and the second power state comprises a reduced power state.

4. The integrated circuit of claim 1, wherein causing the periphery circuit to transition from the first power state to the second power state comprises power gating the periphery circuit.

5. The integrated circuit of claim 1, wherein the memory retention circuit is further configured to, in response to the at least one of the clock status signal or the retention signal, cause a bit cell array associated with the first memory module to transition to a reduced retention voltage.

6. The integrated circuit of claim 5, wherein the bit cell array retains data content at the reduced retention voltage.

7. The integrated circuit of claim 1, wherein causing the periphery circuit to transition from the first power state to the second power state comprises power gating the periphery circuit, and further comprising maintaining full power to a bit cell array associated with the first memory module, wherein the bit cell array retains data content.

8. The integrated circuit of claim 1, wherein:
   the first memory module comprises a first voltage rail coupled to the periphery circuit and a second voltage rail coupled to a bit cell array associated with the first memory module; and
   separate amounts of power are individually applied to each of the first voltage rail and the second voltage rail.

9. The integrated circuit of claim 1, wherein:
   the memory retention circuit resides at a current hierarchy level included in a plurality of hierarchy levels of the integrated circuit, wherein each hierarchy level included in the plurality of hierarchy levels includes one or more memory retention circuits and one or more memory modules; and
   the memory retention circuit receives the retention signal from another memory retention circuit residing at a next higher hierarchy level and is further configured to, in response to the least one of the first signal or the retention signal, automatically cause each memory module residing at the current hierarchy level to transition from the first power state to the second power state.

10. The integrated circuit of claim 1, wherein:
    the memory retention circuit resides at a current hierarchy level included in a plurality of hierarchy levels of the integrated circuit, wherein each hierarchy level included in the plurality of hierarchy levels includes one or more memory retention circuits and one or more memory modules; and
    the memory retention circuit is further configured to transmit a second retention signal to another memory retention circuit residing at a next lower hierarchy level of the integrated circuit, the second retention signal indicating that one or more memory modules residing at the next lower hierarchy level are to transition from the first power state to the second power state.

11. The integrated circuit of claim 1, wherein generating the clock status signal and causing the periphery circuit to transition from the first power state to the second power state are implemented only in hardware.

12. The integrated circuit of claim 1, wherein:
    the memory retention circuit resides at a current hierarchy level included in a plurality of hierarchy levels of the integrated circuit, wherein each hierarchy level included in the plurality of hierarchy levels includes one or more memory retention circuits and one or more memory modules;
    the memory retention circuit is further configured to transmit a second retention signal to a second memory retention circuit residing at a second hierarchy level of the integrated circuit, wherein the second hierarchy level is immediately below the current hierarchy level, and the second retention signal indicates that one or more memory modules residing at the second hierarchy level are to transition from the first power state to the second power state; and
    the second memory retention circuit is configured to transmit a third retention signal to a third memory retention circuit residing at a third hierarchy level of the integrated circuit, wherein the third hierarchy level is immediately below the second hierarchy level, and the third retention signal indicates that one or more memory modules residing at the third hierarchy level are to transition from the first power state to the second power state.

13. A computer-implemented method comprising:
receiving, at a memory retention circuit, a first signal indicating whether a first memory module is entering a clock gating mode;
receiving, at the memory retention circuit, a first clock signal;
receiving, at the memory retention circuit, a retention signal;
generating a clock status signal when either the first signal indicates that the first memory module is entering the clock gating mode or the first dock signal is gated; and
in response to at least one of the clock status signal or the retention signal, causing a periphery circuit associated with the first memory module to transition from a first power state to a second power state.

14. The computer-implemented method of claim 13, wherein the first power state comprises a full power state and the second power state comprises a reduced power state.

15. The computer-implemented method of claim 13, wherein causing the periphery circuit to transition from the first power state to the second power state comprises power gating the periphery circuit.

16. The computer-implemented method of claim 13, further comprising, in response to the at least one of the clock status first signal or the retention signal, causing a bit cell array associated with the first memory module to transition to a reduced retention voltage.

17. The computer-implemented method of claim 13, wherein the memory retention circuit resides at a current hierarchy level included in a plurality of hierarchy levels of an integrated circuit, wherein each hierarchy level included in the plurality of hierarchy levels includes one or more memory retention circuits and one or more memory modules, the computer-implemented method further comprising:
transmitting, by the memory retention circuit, a second retention signal to another memory retention circuit residing at a next lower hierarchy level of the integrated circuit, the second retention signal indicating that one or more memory modules residing at the next lower hierarchy level are to transition from the first power state to the second power state.

18. The computer-implemented method of claim 13, wherein the memory retention circuit resides at a current hierarchy level included in a plurality of hierarchy levels of an integrated circuit, wherein each hierarchy level included in the plurality of hierarchy levels includes one or more memory retention circuits and one or more memory modules, the computer-implemented method further comprising:
transmitting, by the memory retention circuit, a gated clock signal to another memory retention circuit residing at a next lower hierarchy level of the integrated circuit, the gated clock signal indicating that one or more memory modules residing at the next lower hierarchy level are to enter the clock gating mode.

19. The computer-implemented method of claim 13, wherein the memory retention circuit and the first memory module each reside at a current hierarchy level included in a plurality of hierarchy levels of an integrated circuit, wherein each hierarchy level included in the plurality of hierarchy levels includes one or more memory retention circuits and one or more memory modules, the computer-implemented method further comprising, in response to the least one of the first signal or the retention signal, automatically causing a second memory module residing at the current hierarchy level to enter the clock gating mode.

20. The computer-implemented method of claim 13, further comprising, in response to the least one of the clock status signal or the retention signal, power gating a bit cell array associated with the first memory module, wherein the bit cell array does not retain data content.

* * * * *

UNITED STATES PATENT AND TRADEMARK OFFICE
CERTIFICATE OF CORRECTION

PATENT NO. : 11,003,238 B2  
APPLICATION NO. : 15/583872  
DATED : May 11, 2021  
INVENTOR(S) : Anand Shanmugam Sundararajan et al.

Page 1 of 1

It is certified that error appears in the above-identified patent and that said Letters Patent is hereby corrected as shown below:

In the Claims

Column 33, Claim 1, Line 24, please delete "dock" and insert --clock--;

Column 33, Claim 2, Line 43, please delete "dock" and insert --clock--;

Column 35, Claim 13, Line 18, please delete "dock" and insert --clock--;

Column 35, Claim 16, Line 31, please delete "first".

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*